US007863556B2

(12) United States Patent
Hidalgo et al.

(10) Patent No.: US 7,863,556 B2
(45) Date of Patent: Jan. 4, 2011

(54) ENHANCED RESOLUTION MASS SPECTROMETER AND MASS SPECTROMETRY METHOD

(75) Inventors: August Hidalgo, Loveland, CO (US); John Fjeldsted, Loveland, CO (US); William Frazer, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 281 days.

(21) Appl. No.: 12/242,110

(22) Filed: Sep. 30, 2008

(65) Prior Publication Data

US 2009/0020697 A1 Jan. 22, 2009

Related U.S. Application Data

(63) Continuation-in-part of application No. 12/188,932, filed on Aug. 8, 2008, which is a continuation of application No. 11/412,887, filed on Apr. 27, 2006, now Pat. No. 7,412,334.

(51) Int. Cl.
*B01D 59/44* (2006.01)

(52) U.S. Cl. ......................... 250/281; 250/282; 702/23; 702/28; 702/29

(58) Field of Classification Search ................. 250/281, 250/282; 702/23, 28, 29
See application file for complete search history.

(56) References Cited

U.S. PATENT DOCUMENTS

| | | | | |
|---|---|---|---|---|
| 6,373,052 | B1 | 4/2002 | Hoyes | |
| 6,433,713 | B1 | 8/2002 | Fuhrman | |
| 6,653,626 | B2 | 11/2003 | Fischer et al. | |
| 6,680,476 | B1 | 1/2004 | Hidalgo | |
| 6,744,044 | B2 | 6/2004 | Hidalgo et al. | |
| 6,778,125 | B1 | 8/2004 | Stewart et al. | |
| 6,822,227 | B1 | 11/2004 | Hidalgo et al. | |
| 6,878,931 | B1 | 4/2005 | Roushall et al. | |
| 6,974,665 | B2 * | 12/2005 | Berkowitz et al. | 435/4 |
| 7,047,144 | B2 | 5/2006 | Steiner | |
| 7,412,334 | B2 | 8/2008 | Fjeldsted et al. | |
| 2003/0173514 | A1 | 9/2003 | Syage et al. | |
| 2003/0218129 | A1 | 11/2003 | Rather | |

FOREIGN PATENT DOCUMENTS

| | | |
|---|---|---|
| GB | 2385982 | 9/2003 |
| WO | 2006116335 | 2/2006 |

OTHER PUBLICATIONS

UK Intellectual Property Office, Patents Act 1977: Search Report under Section 17(5), Sep. 13, 2007.

* cited by examiner

*Primary Examiner*—Kiet T Nguyen

(57) ABSTRACT

A mass spectrum is generated by a process in which, from a mass scan signal comprising original samples defining a peak, a subset of the original samples defining the peak is selected. One or more synthesized samples are synthesized from the subset of the original samples. The one or more synthesized samples provide a temporal resolution greater than the temporal resolution of the original samples. The one or more synthesized samples are summed with respective temporally-aligned accumulated samples to produce the mass spectrum. The accumulated samples are obtained from mass scan signals generated during respective previously-performed mass scan operations.

27 Claims, 17 Drawing Sheets

ENHANCED RESOLUTION MASS SPECTROMETER AND MASS SPECTROMETRY METHOD

RELATED APPLICATION

This application is a Continuation-in-Part of co-pending U.S. patent application Ser. No. 12/188,932 of Fjeldsted et al. filed on 8 Aug. 2008 and entitled Mass Spectrometer and Method for Enhancing Resolution of Mass Spectra, which is a Continuation of U.S. patent application Ser. No. 11/412,887 of Fjeldsted et al. filed on 27 Apr. 2006 and entitled Mass Spectrometer and Method for Enhancing Resolution of Mass Spectra, now U.S. Pat. No. 7,412,334, the entire disclosures of which are incorporated into this application by reference. U.S. patent application Ser. No. 12/188,932 will be referred to in this disclosure as the parent application.

BACKGROUND

In time-of-flight mass spectrometers (TOFMS), a mass sample to be analyzed is ionized, the resulting ions are accelerated in a vacuum by an electrical pulse having a known potential, and the flight times of the ions of different masses at an ion detector are measured. The more massive the ion, the longer is the flight time. The relationship between the flight time and the mass, m, of ions of a given mass can be written in the form:

$$\text{time}=k\sqrt{m}+c$$

where k is a constant related to flight path and ion energy, and c is a small delay time that may be introduced by the signal cable and/or detection electronics. When the term mass is used in this disclosure in the context of mass spectrometry, it is to be understood to mean mass-to-charge ratio. The process of accelerating the ions of the mass sample and detecting the arrival times of the ions of different masses at the ion detector will be referred to herein as a mass scan operation.

The ion detector generates electrons in response to ions incident thereon. The electrons constitute an electrical signal whose amplitude is proportional to the number of electrons. There is only a statistical correlation between the number of electrons generated in response to a single ion incident on the ion detector. In addition, more than one ion at a time may be incident on the ion detector due to ion abundance.

In the mass spectrometer, an ion accelerator generates a short pulse of ions by applying an electrical pulse having a known voltage to ions received from the ion source. Immediately after leaving the ion accelerator, the ions are bunched together but, within the ion pulse, ions of different masses travel at different speeds. The flight time required for the ions of a given mass to reach the ion detector depends on the speed of the ions, which in turn, depends on the mass of the ions. Consequently, as the ion pulse approaches the ion detector, the ion pulse is separated in space and in time into discrete packets, each packet containing ions of a single mass. The packets reach the ion detector at different arrival times that depend on the mass of the ions therein.

The mass spectrometer generates what will be referred to a mass scan signal in response to a single pulse of ions accelerated by a single electrical pulse. The mass scan signal is a digital signal that represents the output of the ion detector as a function of time. The time represents the time-of-flight of the ions from the ion accelerator to the ion detector. The number of electrons generated by the ion detector in a given time interval constitutes an analog ion detection signal that is converted to the mass scan signal by an analog-to-digital converter (A/D converter). The mass scan signal represents the output of the ion detector as a function of the flight time taken by the ions to reach the ion detector. The mass scan signal is a temporal sequence of digital samples output by the A/D converter after the ions have been accelerated. The conversion time of the A/D converter effectively divides the time axis into discrete bins and the A/D converter outputs a single digital sample for each bin on the time axis.

Because the relationship between the amplitude of the ion detection signal output by the ion detector and the number of ions incident on the ion detector is a statistical one, a single mass scan signal will not accurately represent the mass spectrum of the sample. In addition, the ion detection process is subject to noise from a number of different noise sources. Such noise causes the ion detector to generate an output signal even in the absence of ions incident on the ion detector. To overcome these problems, the mass spectrometer generates multiple mass scan signals and sums the most-recently generated mass scan signal with an accumulation of all previously-generated mass scan signals to generate a mass spectrum having a defined statistical accuracy and signal-to-noise ratio.

The resulting mass spectrum is subject to mass resolution limitations originating from the ion accelerator and the ion detector and its associated circuitry. The mass spectrometer and mass spectrometry method disclosed in the parent application decreased the mass resolution limitations originating from the ion detector and its associated circuitry leaving the ion accelerator as the primary limiter of mass resolution. This has prompted improvements in the precision of the mass accelerator so that, once more, the ion detector and its associated circuitry have become contributors to mass resolution limitations.

Accordingly, what is needed is to reduce the mass resolution limitations imposed by the ion detector and its associated circuitry.

BRIEF DESCRIPTION OF THE DRAWINGS

The disclosure can be better understood with reference to the following drawings. The elements of the drawings are not necessarily to scale relative to each other. Instead, emphasis is placed upon clear illustration. Furthermore, like reference numerals designate corresponding parts throughout the several views.

DETAILED DESCRIPTION

Figure 1:
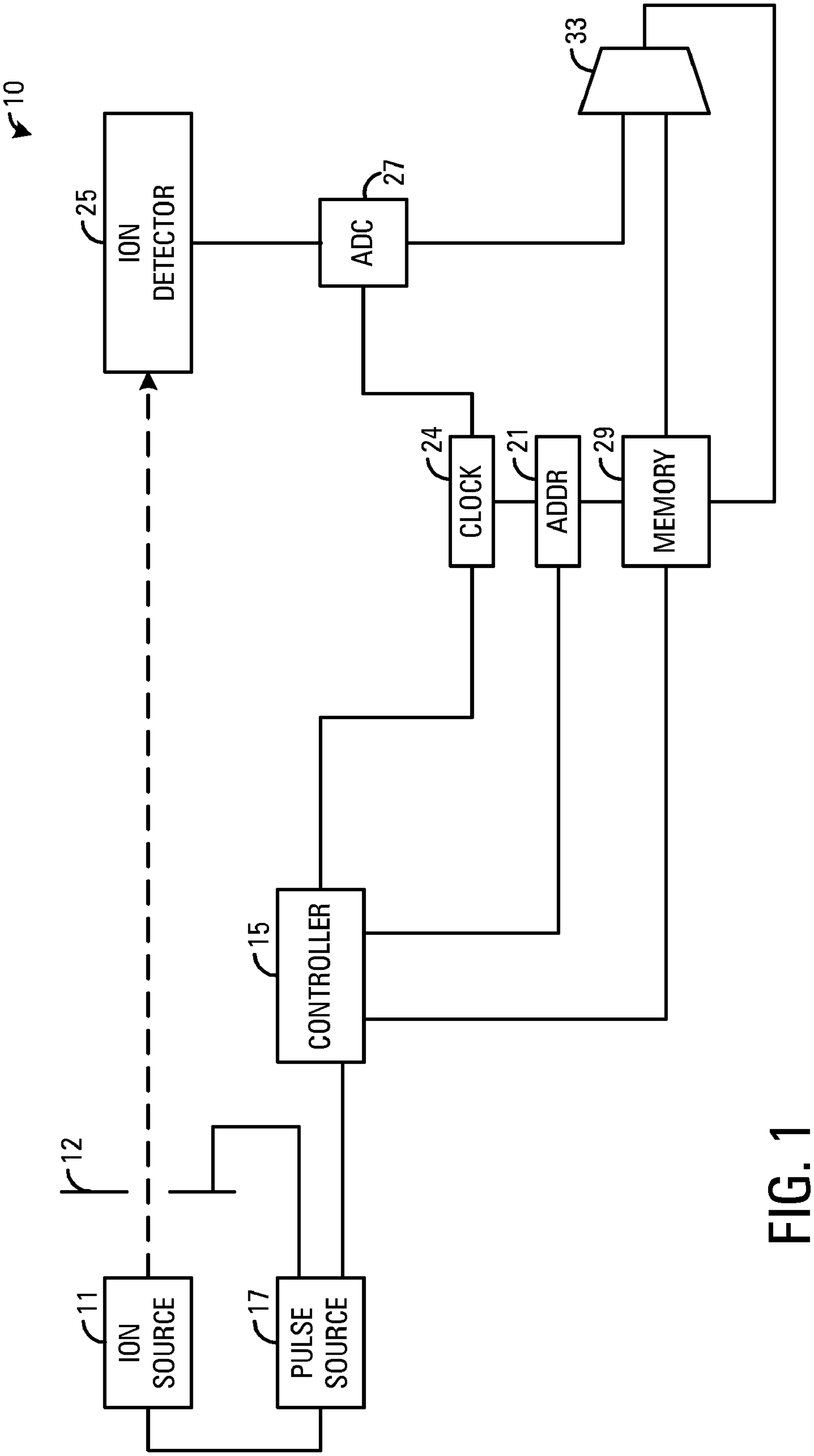
FIG. 1 (PRIOR ART)
FIG. 1 is a block diagram showing an example of a conventional mass spectrometer.

One embodiment of the invention provides a method for generating a mass spectrum in which, from a mass scan signal comprising original samples defining a peak, a subset of the original samples defining the peak is selected. The original samples have a temporal resolution. One or more synthesized samples are synthesized from the subset of the original samples. The one or more synthesized samples provide a temporal resolution greater than the temporal resolution of the original samples. The one or more synthesized samples are summed with respective temporally-aligned accumulated samples to produce the mass spectrum. The accumulated samples are obtained from mass scan signals generated during respective previously-performed mass scan operations.

Another embodiment of the invention provides a mass spectrometer comprising a sample selector, a sample synthesizer and a sample combiner. The sample selector is operable to select, from a mass scan signal comprising original samples defining a peak, a subset of the original samples defining the peak. The original samples have a temporal resolution. The sample synthesizer is operable to synthesize from the subset of the original samples one or more synthesized samples that provide a temporal resolution greater than the temporal resolution of the original samples. The sample combiner is operable to sum the one or more synthesized samples with respective temporally-aligned accumulated samples to produce a mass spectrum. The accumulated samples are generated by the sample selector, the sample synthesizer and the sample combiner from mass scan signals generated during respective previously-performed mass scan operations.

Another embodiment of the invention provides a computer-readable medium in which is fixed a program operable to cause a computational device to perform a method that generates a mass spectrum. In the method performed in response to the program, from a mass scan signal comprising original samples defining a peak, a subset of the original samples defining the peak is selected. The original samples have a temporal resolution. One or more synthesized samples are synthesized from the subset of the original samples. The one or more synthesized samples provide a temporal resolution greater than the temporal resolution of the original samples. The one or more synthesized samples are summed with respective temporally-aligned accumulated samples to produce the mass spectrum. The accumulated samples are obtained from mass scan signals generated during respective previously-performed mass scan operations.

In one example, the one or more synthesized samples are generated by subjecting the original samples in the subset to interpolation. Typically, at least one temporally-extreme one of the original samples in the subset comprising the synthesized samples is suppressed to generate a truncated subset, and the original samples in the truncated subset are summed with respective temporally-aligned ones of the accumulated samples to generate respective new accumulated samples.

In another example, a single synthesized sample having a time component and an amplitude component is generated from the original samples in the subset. The original samples in the subset are subject to a centroid calculation to obtain the time component of the synthesized sample, and the amplitude component of the synthesized sample is generated from at least one of the original samples in the subset. In embodiments, the amplitude component of the synthesized sample is generated from the original samples in the subset by selection or by interpolation.

FIG. 1 is a block diagram showing an example of a conventional time-of-flight mass spectrometer 10. A mass sample to be analyzed is introduced into an ion source 11 that ionizes the sample. The ions so produced are accelerated by applying a potential between the ion source 11 and an electrode 12. The mass spectrum of the mass sample to be analyzed is generated by accumulating the mass scan signals generated by respective mass scan operations. At the beginning of each mass scan operation, a controller 15 causes a pulse source 17 to apply a short electrical pulse between the electrode 12 and ion source 11. The controller 15 also resets the contents of a write address register 21. Subsequent periods of a conversion clock signal provided by a clock 24 increment the address register 21, and an analog ion detection signal generated by an ion detector 25 is digitized by an analog-to-digital converter (A/D converter) 27 to generate a digital mass scan signal composed of a temporal sequence of digital samples. Unless explicitly stated that a sample is an analog sample, the word sample, as used herein, refers to a digital sample, i.e., a digital value that represents the amplitude of a respective analog sample of the analog signal. An adder 33 sums an accumulated sample (if any) stored in memory 29 at the address specified by the address register 21 with the sample provided by A/D converter 27 to generate a new accumulated sample. The new accumulated sample is then stored back in memory 29 at the address specified by the address register 21. Similar operations are performed for each remaining value of the write address in the range of write addresses generated by address register 21 to generate the remainder of a mass spectrum stored in memory 29. The range of write addresses extends from zero to a value approximately equal to $(\Delta mf)^2$, where Δm is the range of masses resolved by mass spectrometer 10 and f is the frequency of the conversion clock signal generated by clock 24 and applied to A/D converter 27.

As noted above, the flight time required by an ion to traverse the distance between the electrode 12 and the ion detector 25 provides a measure of the mass of the ion. The value in address register 21 when the ion is incident on the ion detector 25 is proportional to the flight time. Hence, after mass spectrometer 10 has performed a number of mass scan operations, memory 29 accumulates data that indicates the abundance of ions with a given mass as a function of the mass of the ions. In other words, the data stored in memory 29 represents a mass spectrum of the sample being analyzed.

Various devices, such as a Faraday cup, multichannel plate (MCP), electron multiplier (continuous structure as well as dynode structure), conversion dynode, Daly ion detector, and combinations thereof, may be used to implement the ion detector 25. The ion detection signal generated by the ion detector 25 depends on the number of ions incident on the ion detector 25 in a time corresponding to the sampling time of A/D converter 27. Moreover, in a time-of-flight mass spectrometer, heavier ions arrive at the ion detector 25 after lighter ions. The ion detection signal output by the ion detector 25 as a function of flight time exhibits pulses that can be identified as originating from ions of specific masses. A pulse in the ion detection signal is due to ions of a particular mass being incident on the ion detector 25 during a small interval of time. Ions of the same mass are generally bunched together as they travel toward and are incident on the ion detector 25 and will be referred to hereafter as an ion packet. Thus, ions within the same ion packet have the same mass. Further, the pulses exhibited by the ion detection signal generated by the ion detector 25 will be referred to below as analog pulses.

In general, the number ions in each ion packet is relatively small, and hence the statistical accuracy of the mass scan signal obtained in a single mass scan operation is usually insufficient. In addition, there can be a significant amount of noise in the system. The noise is generated both in the ion detector 25, the analog signal path, and in the A/D converter 27.

To improve statistical accuracy, the mass scan signals generated by a large number of respective mass scan operations are accumulated to produce the mass spectrum of the mass sample. At the beginning of the mass spectrum measurement process, the controller 15 stores zeros in all of the memory locations in memory 29 and initiates the first mass scan operation. The first mass scan operation causes a first mass scan signal to be stored in memory 29 as a mass spectrum. When the first mass scan operation is completed, the controller 15 resets the address register 21 and initiates another mass scan operation by causing the pulse source 17 to pulse the electrode 12. The second mass scan signal generated by the second mass scan operation is added to the mass spectrum stored in memory 29 to generate a new mass spectrum having a better statistical accuracy than the previous mass spectrum. The process just described is repeated until the new mass spectrum has the desired statistical accuracy.

Small variations in the mass scan signals degrade the mass resolution of the mass spectrum defined by the accumulated samples stored in memory 29. For example, clock jitter may cause small timing variations in the mass scan signals, and the effect of these small timing variations on the mass spectrum can become significant as many different mass scan signals are accumulated. Further, variations in the pulse source 17 may cause the electrodes 12 to ionize the mass sample of the ion source 11 such that ions of the same mass have slightly different initial energies. As a result, ions of the same mass may be incident on the ion detector 25 at slightly different times. In addition, the ion detector 25 has finite rise and fall times. Thus, even if ions of the same mass were incident on the ion detector 25 at exactly the same time, the pulse exhibited by the ion detection signal output by the ion detector 25 would have a pulse width spanning a finite range of time. The analog signal path, including the analog portion of A/D converter 27, may further increase the width of the pulses exhibited by the ion detection signal output by the ion detector 25. These and other variations can significantly degrade the mass resolution of the mass spectrum.

To better illustrate the foregoing, refer to FIGS. 2A-2D, which respectively depict exemplary pulses 41-44 exhibited by the ion detection signal output by the ion detector 25 during corresponding temporal portions of four mass scan operations performed by mass spectrometer 10. As shown in FIGS. 2A-2D, each pulse 41-44 has a finite pulse width, which is related to the rise and fall times of the ion detector 25. Further, ions of the same mass may be incident on the ion detector 25 at different times due to the variations described above, thereby increasing the finite pulse widths of the pulses 41-44.

The pulses 41-44 depicted in FIGS. 2A-2D, respectively, are corresponding pulses in the analog ion detection signal output by the ion detector 25 during respective mass scan operations performed by mass spectrometer 10. As used in this disclosure, pulses are corresponding if they are caused by ions of the same mass incident on ion detector 25. Thus, the pulses 41-44 shown in FIGS. 2A-2D are caused by ions of the same mass and, ideally, each would occur at the same time (x) after the start of its respective mass scan operation. The ion detection signals that exhibit pulses 41-44 are each digitized to produce respective mass scan signals and the samples constituting the mass scan signals are accumulated to define a single peak in the mass spectrum. However, as can be seen by comparing FIGS. 2A-2D, variations in the pulse source 17 and/or the ion detector 25 cause small timing offsets among the pulses 41-44. The maximum of the pulse 41 shown in FIG. 2A occurs at time x after the start of the first mass scan operation, but the maximum of the pulse 42 shown in FIG. 2B occurs at a time greater than x after the start of the second mass scan operation, the maximum of the pulse 43 shown in FIG. 2C occurs at a time less than x after the start of the third mass scan operation, and the maximum of the pulse 44 shown in FIG. 2D occurs at a time less than x after the start of the fourth mass scan operation.

Figure 2A:
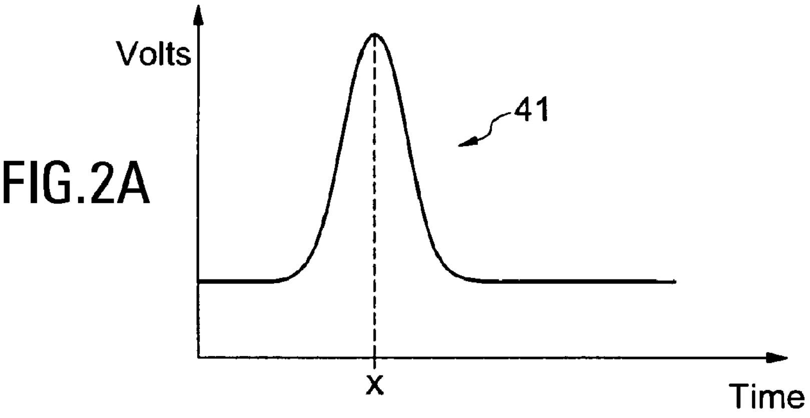
FIG. 2A is a graph illustrating an exemplary analog pulse exhibited by an ion detection signal output by an ion detector, such as is depicted in FIGS. 1 and 5, during a first mass scan operation.
Figure 2B:
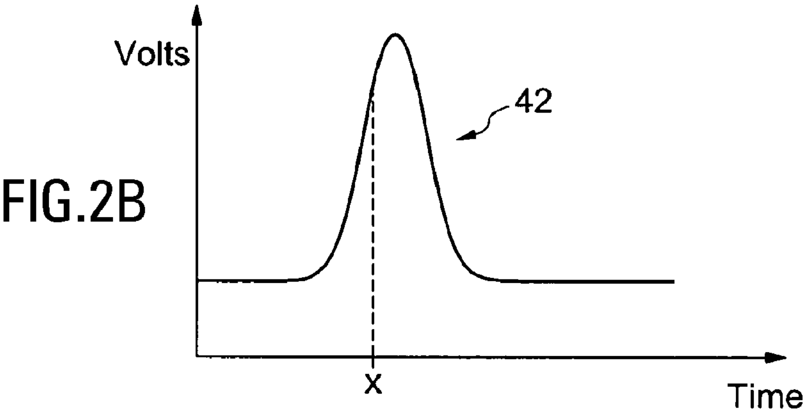
FIG. 2B is a graph illustrating an exemplary analog pulse exhibited by an ion detection signal output by an ion detector, such as is depicted in FIGS. 1 and 5, during a second mass scan operation and corresponding to the analog pulse shown in FIG. 2A.
Figure 2C:
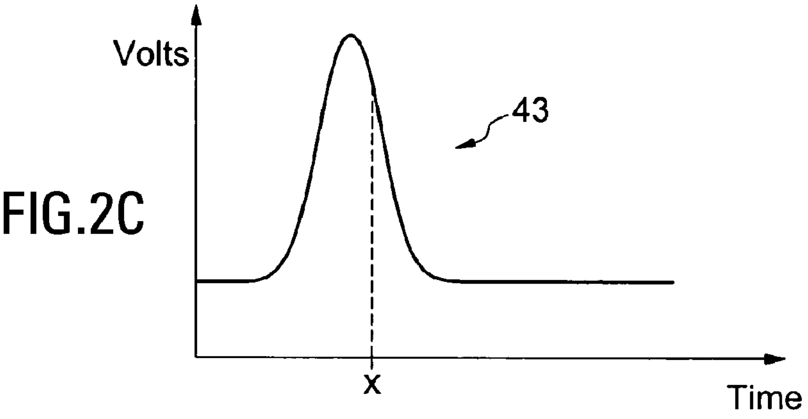
FIG. 2C is a graph illustrating an exemplary analog pulse exhibited by an ion detection signal output by an ion detector, such as is depicted in FIGS. 1 and 5, during a third mass scan operation and corresponding to the analog pulses shown in FIGS. 2A and 2B.
Figure 2D:
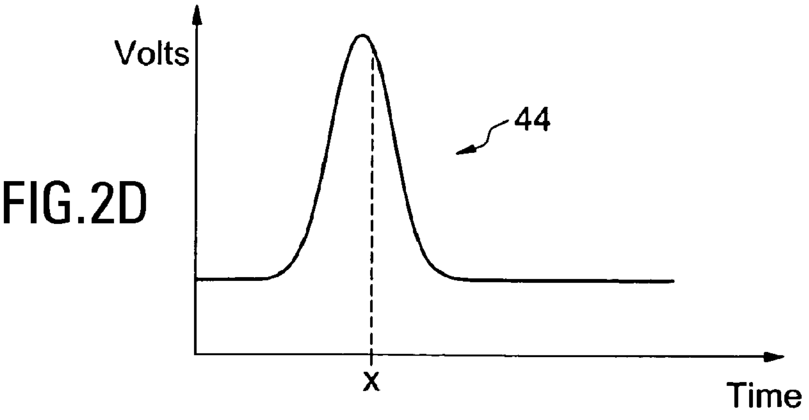
FIG. 2D is a graph illustrating an exemplary analog pulse exhibited by an ion detection signal output by an ion detector, such as is depicted in FIGS. 1 and 5, during a fourth mass scan operation and corresponding to the analog pulses shown in FIGS. 2A-2C.
Figure 3A:
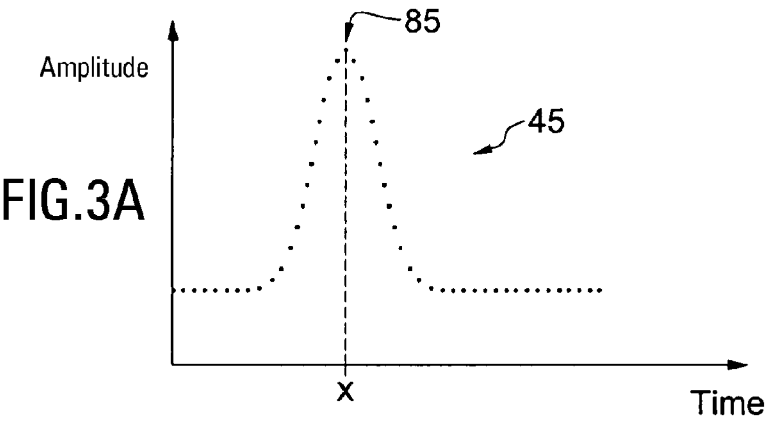
FIGS. 3A-3D are graphs illustrating exemplary samples obtained by digitizing the analog pulses shown in FIGS. 2A-2D, respectively.
Figure 3B:
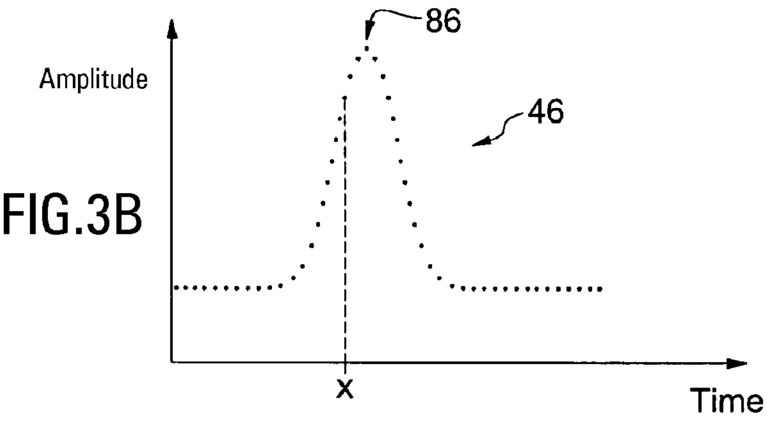
Figure 3C:
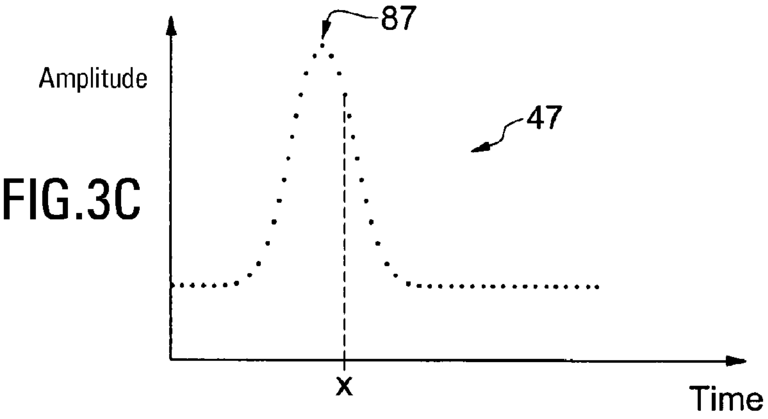
Figure 3D:
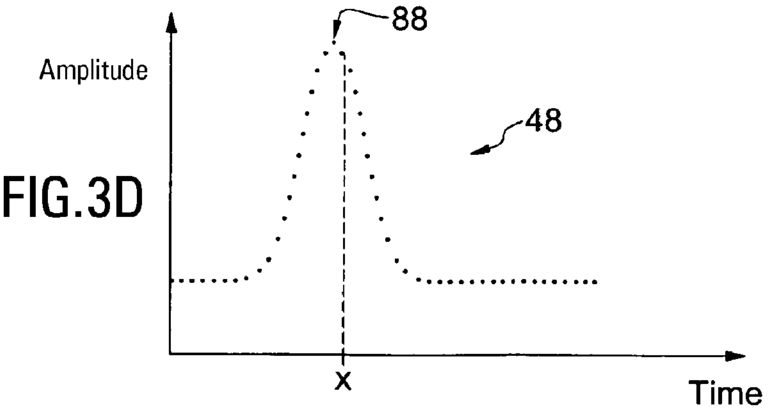

The analog ion detection signals that exhibit the pulses 41-44, respectively, are digitized by the A/D converter 27 (FIG. 1) to generate respective mass scan signals that are output by the A/D converter. FIGS. 3A-3D respectively depict mass scan signals that exhibit peaks 45-48, respectively. Each of the points constituting the mass scan signals shown in FIGS. 3A-3D represents a sample of one of the ion detection signals exhibiting pulses 41-44 shown in FIGS. 2A-2D, respectively. In particular, FIG. 3A depicts a mass scan signal exhibiting a peak 45 obtained by digitally sampling the ion detection signal exhibiting pulse 41 shown in FIG. 2A, FIG. 3B depicts a mass scan signal exhibiting a peak 46 obtained by digitally sampling the ion detection signal exhibiting the pulse 42 shown in FIG. 2B, FIG. 3C depicts a mass scan signal exhibiting a peak 47 obtained by digitally sampling the ion detection signal exhibiting the pulse 43 shown in FIG. 2C, and FIG. 3D depicts a mass scan signal exhibiting a peak 48 obtained by digitally sampling the ion detection signal exhibiting the pulse 44 shown in FIG. 2D.

Figure 4:
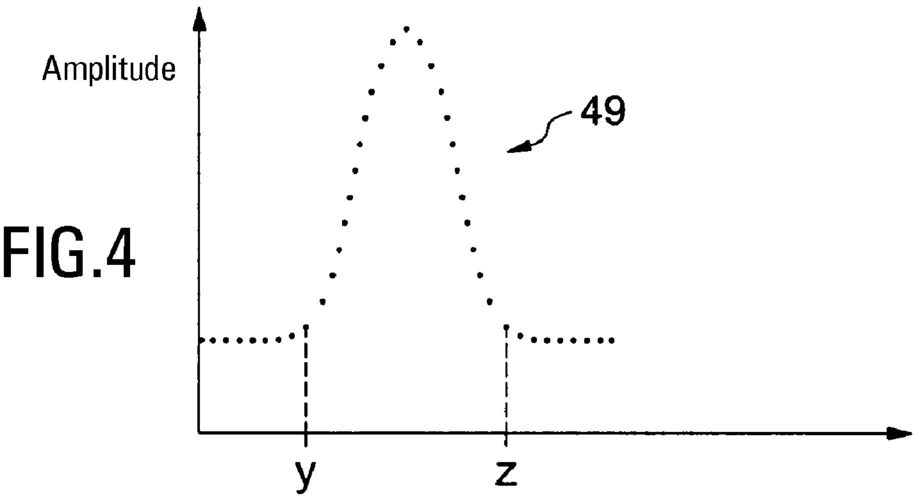
FIG. 4 is a graph illustrating an exemplary peak exhibited by a mass spectrum generated by the mass spectrometer shown in FIG. 1 summing the samples shown in FIGS. 3A-3D.

FIG. 4 depicts a mass spectrum exhibiting a peak 49 resulting from accumulating the mass scan signals exhibiting peaks 45-48 shown in FIGS. 3A-3D as would be performed by the conventional mass spectrometer 10 (FIG. 1). The peak 49 has a relatively large width (z−y) in the time domain. This is due not only to the non-zero pulse widths of the pulses 41-44 but also to the jitter collectively exhibited by pulses 41-44. The above-described temporal offsets of the pulses 41-44 increase the overall width of the peak 49.

Figure 5:
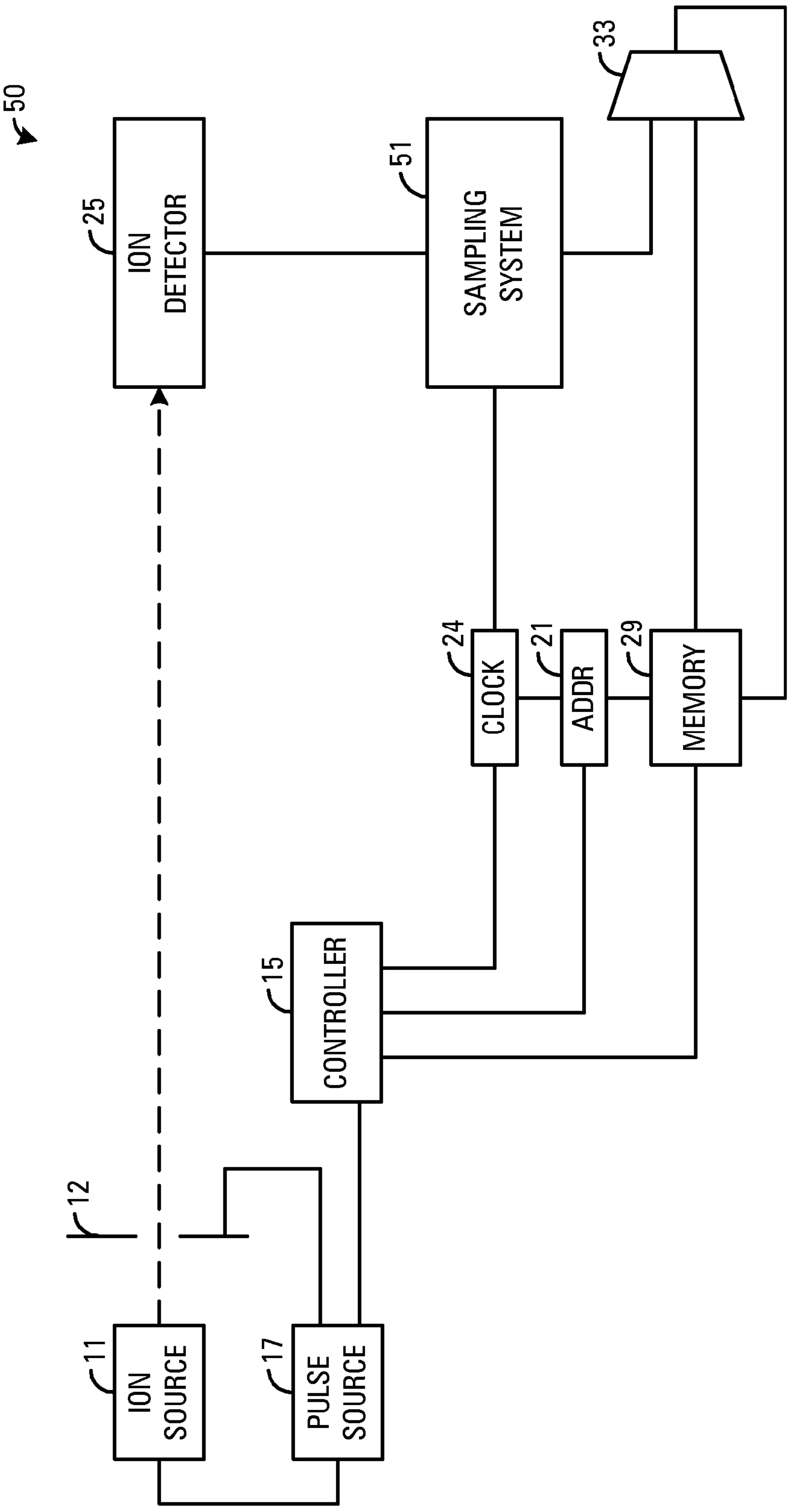
FIG. 5 is a block diagram showing an example of a mass spectrometer in accordance with an embodiment of the parent application.

FIG. 5 is a block diagram showing an example of a time-of-flight mass spectrometer 50 in accordance with an embodiment disclosed in the parent application. To simplify the description of FIG. 5 and subsequent drawings, those elements that serve functions analogous to elements described above with reference to FIG. 1 are indicated by the same reference numerals.

In the example shown in FIG. 5, the mass spectrometer 50 is composed of an ion source 11, a controller 15, a pulse source 17, a write address register 21, a clock 24, an ion detector 25, memory 29, an adder 33, and a sampling system 51. The elements 17, 21, 24, 25, 27, 29, and 33 perform essentially the respective functions as the elements with the same reference numerals in FIG. 1.

Figure 6:
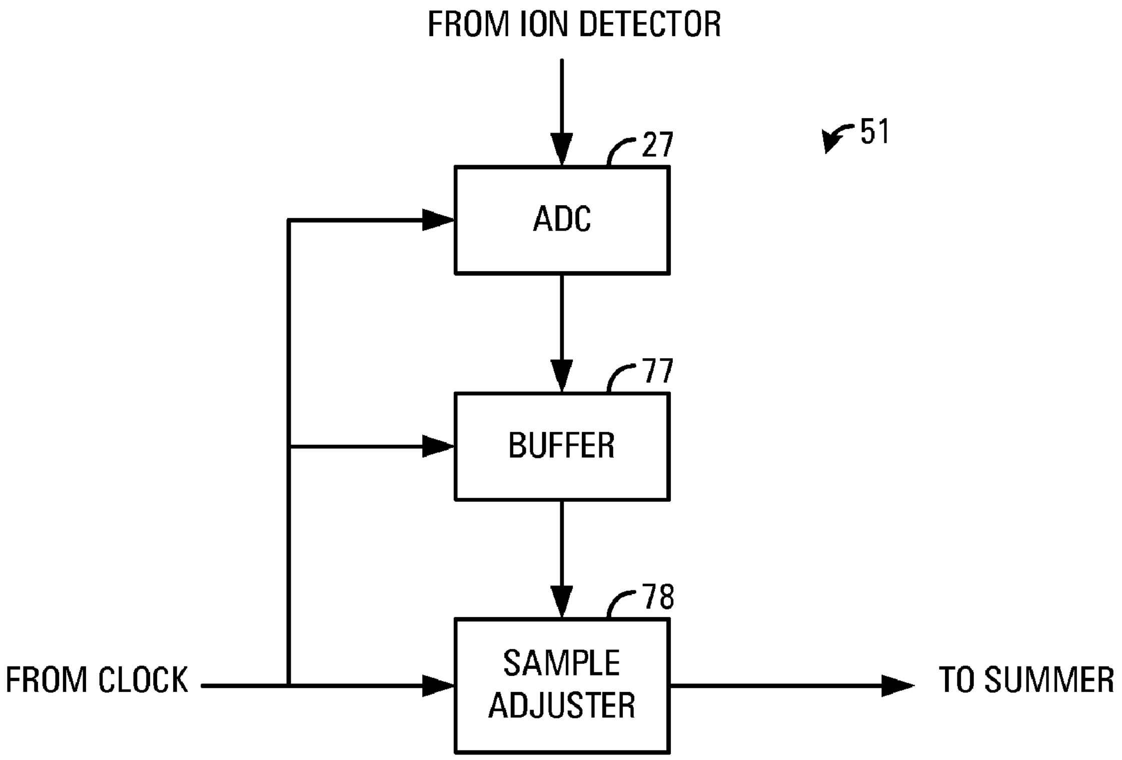
FIG. 6 is a block diagram illustrating an exemplary sampling system, such as that depicted in FIG. 5.

FIG. 6 is a block diagram showing an example of sampling system 51. In the example shown, sampling system 51 is composed of an A/D converter 27, a buffer 77 and a sample adjuster 78.

In a manner similar to that described above with reference to FIG. 1, a mass sample to be analyzed is introduced into the ion source 11 that ionizes the mass sample. A pulse from the pulse source 17 applied to the electrode 12 accelerates the ions in the ion source 11 toward the ion detector 25, which detects the accelerated ions. The ion detector 25 outputs an analog ion detection signal whose amplitude is indicative of the number of ions incident on the ion detector.

In a manner similar to that described above with reference to FIG. 1, the analog ion detection signal output by the ion detector 25 shown in FIG. 5 is sampled by the A/D converter 27 shown in FIG. 6. Referring to FIG. 6, a number of the samples output by the A/D converter 27 are temporarily stored in a buffer 77 and such samples are processed by a sample adjuster 78, which will be described in more detail below. The samples output by the sample adjuster 78 constitute an adjusted mass scan signal that is summed by a summer 33 (FIG. 5) with the mass spectrum obtained by accumulating the adjusted mass scan signals generated by previously-performed mass scan operations to generate a new mass spectrum, and the new mass spectrum is stored in memory 29.

Thus, the mass spectrometer 50 shown in FIG. 5 generates a mass spectrum by accumulating the mass scan signals respectively generated by a large number of mass scan operations. At each address location in memory 29 is stored an accumulated sample that provides one data point of the mass spectrum represented by the accumulated samples stored in respective memory locations in memory 29.

The controller 15 and the sample adjuster 78 can be implemented in hardware, software, or a combination thereof. As an example, the controller 15 and/or the sample adjuster 78 may be implemented in software and executed by a programmable logic array, a digital signal processor (DSP), a central processing unit (CPU), or other type of apparatus for executing the instructions of the controller 15 and/or the sample adjuster 78. In other embodiments, the controller 15 and/or the sample adjuster 78 can be implemented in firmware or hardware, such as logic gates, for example.

The sample adjuster 78 is configured to identify peaks in each mass scan signal received from the A/D converter 27. Further, for each identified peak, the sample adjuster 78 is configured to designate at least one of the samples as an active sample. As used in this disclosure, an active sample is a sample that is not to be suppressed by the sample adjuster 78.

For each peak identified in each mass scan signal received from A/D converter 27, sample adjuster is configured to identify a predefined number of the samples having the highest values as the active samples for the peak. Thus, the active samples for a given peak are the highest-value ones of the samples defining the peak. In one embodiment, as will be described in more detail below, for each peak, the sample adjuster 78 identifies only the one sample having the highest value (i.e., the highest-value one of the samples defining the peak) as the active sample. In this example, each peak has only one active sample. In other embodiments, for each peak, the sample adjuster 78 identifies two or more of the samples having the highest values as the active samples for the peak.

The sample adjuster 78 allows all active samples to pass to memory 29 unsuppressed but suppresses all of the other samples constituting the mass scan signal (i.e., each sample not identified as an active sample by the sample adjuster 78). As used in this disclosure, a sample is suppressed when it is assigned a value lower than the actual value assigned to it by the A/D converter 27, or it is prevented from affecting the respective accumulated sample constituting one data point of the mass spectrum accumulated in memory 29. In an example, the sample adjuster 78 suppresses a sample by assigning such sample a value of zero (0). Thus, each suppressed sample does not affect the mass spectrum accumulated in memory 29.

Various techniques exist that may be employed by the sample adjuster 78 to identify peaks in the mass scan signal constituted by the samples generated by A/D converter 27. In one embodiment, the sample adjuster 78 identifies a peak in a region of the mass scan signal in which at least a minimum number, p, of consecutive samples having increasing values is immediately followed by at least a minimum number, q, of consecutive samples having decreasing values. Note that the numbers p and q may be specified by a user or predefined within the sample adjuster 78. Further, numbers p and q may be equal.

When sample adjuster 78 identifies a peak in the mass scan signal, it additionally identifies as a maximum sample the sample within the above-described two strings having the highest value. Such a sample is typically identified by the sample adjuster 78 as an active sample for the identified peak. Moreover, the sample adjuster 78 allows each sample identified as an active sample to pass unchanged through the sample adjuster 78 as part of the adjusted mass scan signal, and suppresses each of the other samples.

To better illustrate the foregoing, assume that the ion detector 25 of mass spectrometer 50 outputs the ion detection signals exhibiting corresponding pulses 41-44 shown in FIGS. 2A-2D in consecutive mass scan operations, as described above with reference to the conventional spectrometer 10. In such an example, the A/D converter 27 receives the ion detection signals exhibiting the pulses 41-44 shown in FIGS. 2A-2D, and, in response thereto, outputs respective mass scan signals exhibiting the peaks 45-48 shown in FIGS. 3A-3D, respectively. Referring to FIGS. 3A-3D, assume that samples 85-88 are the maximum samples of peaks 45-48, respectively, and that the sample adjuster 78 is configured to identify, for each peak, only the peak's maximum sample as a respective active sample. In such an example, the sample adjuster 78, upon identifying the peak 45 as a peak and identifying the sample 85 as the maximum sample of peak 45, suppresses all of the samples defining peak 45 except the maximum sample 85.

Figure 7:
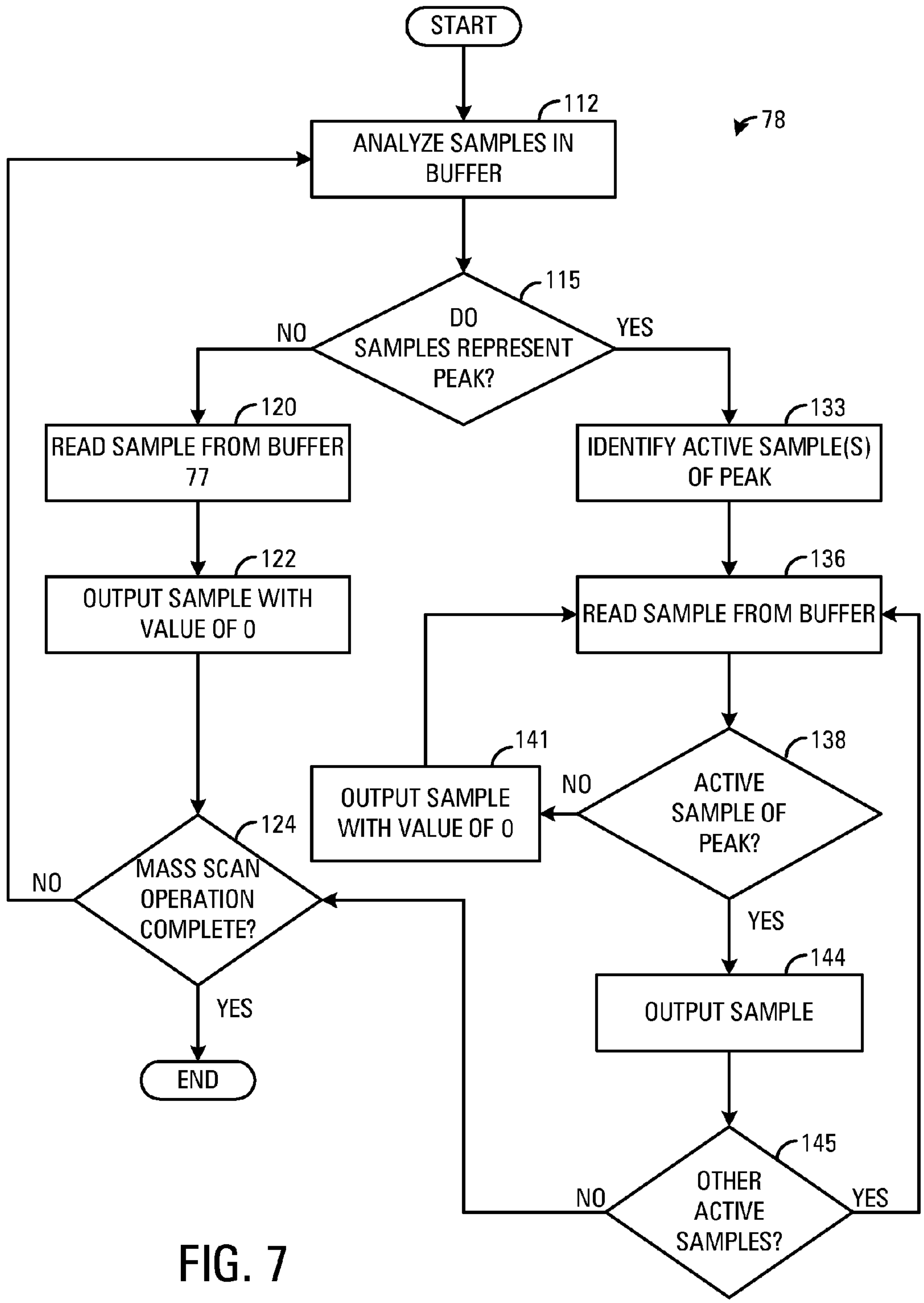
FIG. 7 is a flowchart illustrating an exemplary architecture and functionality of the sample adjuster depicted in FIG. 6.

Various techniques exist and may be used to identify the maximum sample of the peak 45 and to suppress all of the samples of the peak 45 except the maximum sample 85. FIG. 7 illustrates an exemplary process that may be used to achieve the foregoing. The sequence of samples generated by A/D converter 27 and constituting a mass scan signal are written to and read out of the buffer 77 (FIG. 6) on a first-in, first-out (FIFO) basis. During the first mass scan operation, samples defining the peak 45 are among those written into the buffer 77 by the A/D converter 27 as the A/D converter 27 samples the ion detection signal exhibiting pulse 41. In block 112, the sample adjuster 78 analyzes the samples stored in the buffer 77 to determine whether the samples define a peak. For examples, the sample adjuster 78 compares the samples in the buffer 77 and determines that these samples define a peak when such samples include at least a number p of consecutive samples of increasing values followed by at least a number q of consecutive samples of decreasing values.

Other techniques for identifying a peak, such as peak 45, in a mass scan signal are known and may be used in other embodiments. As an example, the sample adjuster 78 may identify any sample as defining a peak if it is immediately preceded by a sample of lower value and is followed by a sample of lower value within the next two samples.

If the samples in buffer 77 do not define a peak, then the sample adjuster 78 reads and suppresses the next sample in the buffer 77. In particular, the sample adjuster 78 reads the next sample in the buffer 77 and outputs a value of zero, as shown by blocks 120 and 122, effectively replacing the sample's actual value with the value of zero (0). The suppressed sample output by the sample adjuster 78 is then summed by summer 33 with the accumulated sample read from the memory 29 at the address specified by the address register 21. Note that, as each sample is read out of the buffer 77 by the sample adjuster 78, a new sample is written to the buffer 77 by the A/D converter 27. If the current mass scan operation being performed by the mass spectrometer 50 is not yet complete, then the sample adjuster 78 makes a "no" determination in block 124 and returns to block 112, where it once more analyzes the samples currently stored in the buffer 77. These samples include sample newly-written to the buffer 77 by A/D converter 27.

Once the sample adjuster 78 has determined in block 115 that the samples temporarily stored in buffer 77 define a peak, such as peak 45, then, in block 133, the sample adjuster 78 identifies the one or more active samples of the peak. In the instant example, assume that the sample adjuster 78 only identifies the maximum sample for each peak as the active sample for the peak. Thus, when the sample adjuster 78 makes a "yes" determination in block 115, in block 133, the sample adjuster 78 identifies the highest-value one of the samples defining the peak and stored in the buffer 77 as the active sample for the peak. Thus, the sample adjuster 78 can compare the samples stored in the buffer 77 with one another to find the sample with the highest value and identify this sample as the active sample for the peak. Other techniques for identifying the active sample or samples of a peak may be employed in other embodiments.

In block 136, the sample adjuster 78 reads the next sample from the buffer 77 on a FIFO basis and, in block 138, determines whether this sample was identified in block 133 as an active sample. If not, the sample adjuster 78 suppresses this sample. In particular, upon reading the next sample in block 136, the sample adjuster 78 outputs a value of zero, as shown by block 141, effectively replacing the actual value of the sample with the value of zero (0).

However, if the value read from the buffer 77 in block 136 was identified in block 133 as an active sample, then in block 144, the sample adjuster 78 outputs the sample without changing its value. The sample currently output by the sample adjuster 78 in either block 141 or block 144 is output to summer 33, which sums the sample with the accumulated sample read from memory 29 at the address specified by the address register 21 to generate a new accumulated sample that is written in memory 29 at the same address. The new accumulated sample is one data point of the new mass spectrum being generated in memory 29 by the current mass scan operation. Further, in block 145, the sample adjuster 78 determines whether any additional active samples were identified in block 133 for the peak identified in block 115. In the instant example, only one active sample is identified in block 133 for each peak. Thus, in this example, a "no" result should be obtained in block 145, and the sample adjuster 78 goes to block 124. However, in other examples in which more than one active sample is identified for each peak, a "yes" result may be obtained in block 145. In such a case, the sample adjuster 78 returns to block 136.

Figure 8A:
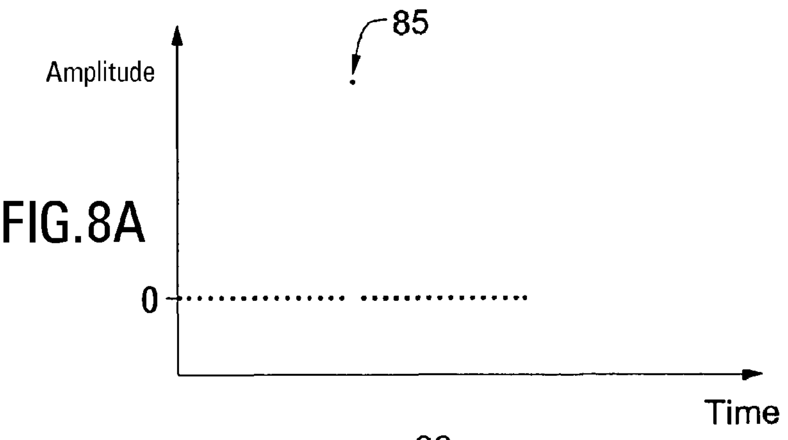
FIGS. 8A-8D are graphs illustrating examples of the active samples output by the sample adjuster shown in FIG. 6 upon processing, as input, the samples shown in FIGS. 3A-3D, respectively.

In mass spectrometer 50, for each peak in the mass scan signal, rather than A/D converter 27 outputting all of the samples defining the peak to the summer 33 as is done in the conventional mass spectrometer 10, the sample adjuster 78 outputs only one or more active samples, and suppresses the remaining samples. For example, instead of summer 33 receiving all of the samples defining peak 45 shown in FIG. 3A, as in mass spectrometer 10, in mass spectrometer 50, summer 33 receives only the single active sample 86 shown in FIG. 8A. As shown in FIG. 8A, all of the samples defining the peak 45 except for a single active sample, i.e., the maximum sample 85, are suppressed by the sample adjuster 78. Thus, only the maximum sample 85 of the identified peak actually changes any of the accumulated samples stored in the memory 29 and, therefore, affects the mass spectrum defined by the accumulated samples stored in memory 29.

Figure 8B:
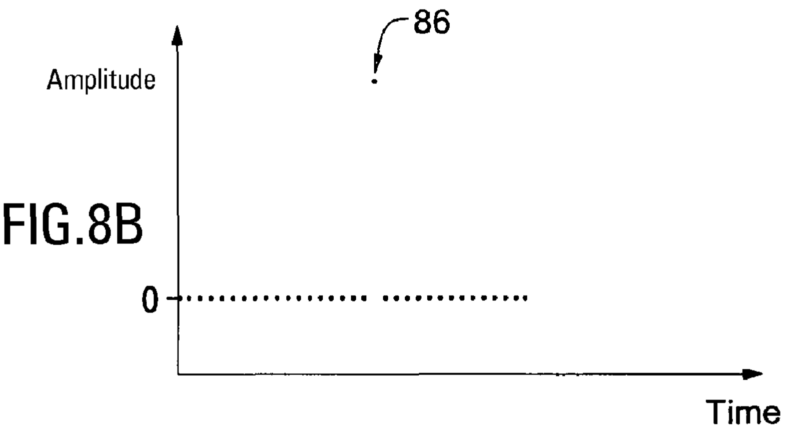
Figure 8C:
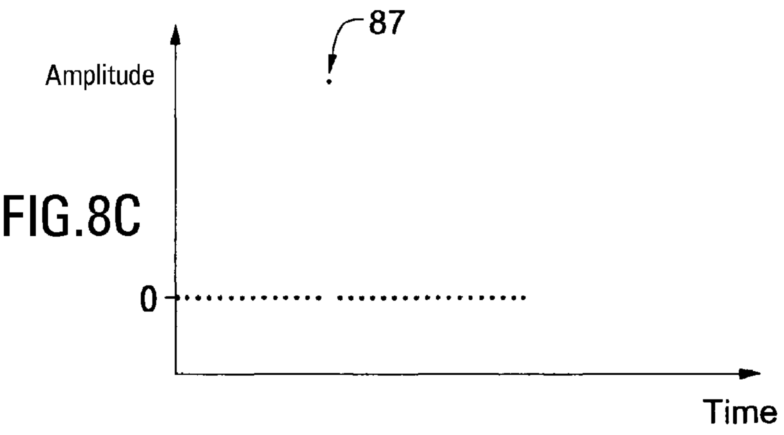
Figure 8D:
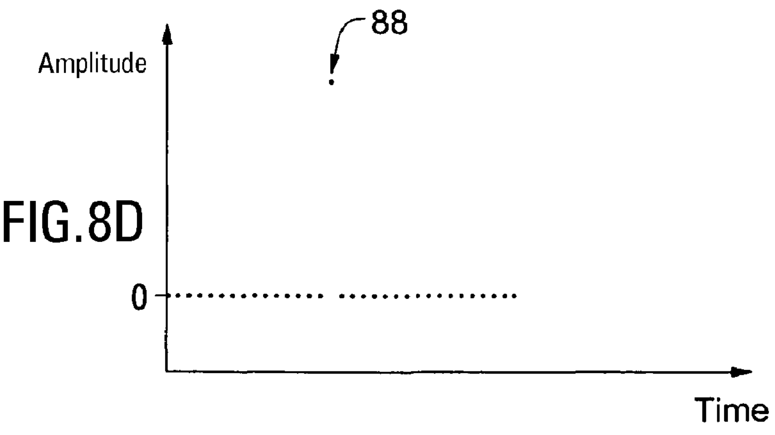

During subsequent mass scan operations, the above-described process is repeated for the respective mass scan signals that exhibit peaks 46-48 output by the ADC 27. In particular, in the next mass scan operation, the A/D converter 27 outputs the mass scan signal exhibiting the peak 46 shown in FIG. 3B. The sample adjuster 78, however, suppresses all of the samples defining peak 46 except for the maximum sample 86. Thus, the sample adjuster 78 converts the mass scan signal exhibiting peak 46 shown in FIG. 3B into the adjusted mass scan signal exhibiting maximum sample 86 shown in FIG. 8B. In the next mass scan, the A/D converter 27 outputs the mass scan signal exhibiting peak 47 shown in FIG. 3C and suppresses all of the samples defining peak 47 except for the maximum sample 87. Thus, the sample adjuster 78 converts the mass scan signal exhibiting peak 47 shown in FIG. 3C into the adjusted mass scan signal exhibiting maximum value 87 shown in FIG. 8C. Further, in the next mass scan, the A/D converter 27 outputs the mass scan signal exhibiting peak 48 shown in FIG. 3D and suppresses all of the samples defining peak 48 except for the maximum sample 88. Thus, the sample adjuster 78 converts the mass scan signal exhibiting peak 48 shown in FIG. 3D into the adjusted mass scan signal including maximum sample 88 shown in FIG. 8D.

Figure 9:
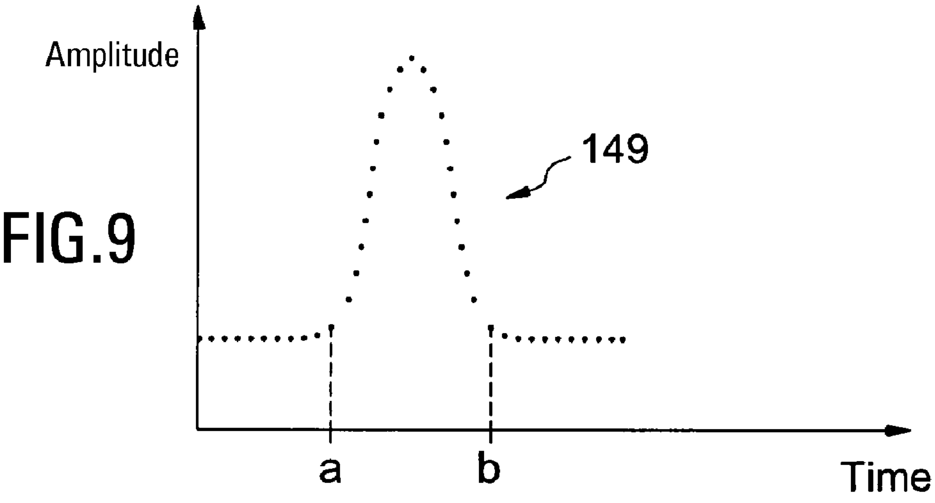
FIG. 9 is a graph illustrating an exemplary peak exhibited by a mass spectrum generated by the mass spectrometer shown in FIG. 5 summing the active samples shown in FIGS. 8A-8D.

FIG. 9 depicts an exemplary peak 149 that constitutes part of a mass spectrum obtained by accumulating the adjusted mass scan signals shown in FIGS. 8A-8D. As a result of the processing performed by the sample adjuster 78, as described above, the peak 149 has a width (b–a) that is narrower than that of the peak 49 of the mass spectrum generated by the conventional mass spectrometer 10 and shown in FIG. 4. Accordingly, the processing performed by the sample adjuster 78 enhances the resolution of the mass spectrum defined by the accumulated samples stored in the memory 29.

It is possible for multiple samples defining the same peak to have the same value. For example, a sample on the leading edge of a peak may have the same value as a sample on the trailing edge of the same peak. If two or more samples defining the same peak are equal and are the highest-value ones of the samples defining the peak, then the sample adjuster 78 may be configured to select in block 133 of FIG. 7 any of the equal-value samples as the active sample for the peak.

For example, when the two highest-value samples defining a given peak are equal in value, the sample adjuster 78 may always select the earlier of the two equal samples or, in another embodiment, may always select the later of the two equal samples. In another embodiment, the sample adjuster 78 may select the earlier and the later of the two equal samples per peak alternately. For example, for the first peak for which the two highest-value samples are equal, the sample adjuster 78 selects the earlier of the two equal samples as the first peak's maximum sample. For the second peak for which the two highest-value samples are equal, the sample adjuster 78 selects the later of the two equal samples as the second peak's maximum sample. For the next peak for which the two highest-value samples are equal, the sample adjuster 78 select the earlier of the two equal samples as the peak's maximum sample, and so on for the remaining peaks.

In addition, as described above, it is unnecessary for the sample adjuster 78 to allow only one sample to pass unsuppressed. For example, the sample adjuster 78 may allow the three highest-value samples per peak to pass unsuppressed. Other numbers of samples may be allowed to pass unsuppressed through the sample adjuster 78 per peak in other examples.

Generally, below a certain threshold number of samples per peak identified as active samples, increasing the number of samples per peak identified as active samples and therefore allowed to pass unsuppressed decreases the mass resolution of the peaks of the mass spectrum defined by the accumulated samples stored in memory 29 but increases the accuracy with which the centers of the peaks are represented in the mass spectrum. Thus, a trade-off between mass resolution and center-of-peak accuracy has to be made when selecting the number of samples per peak that the sample adjuster 78 identifies as active samples. The threshold number of samples is apparatus-dependent. In an exemplary embodiment of mass spectrometer 50 described above with reference to FIG. 5, the threshold number of samples per peak is three samples per peak.

Specifically, to enhance the mass resolution of the mass spectrum at the expense of reduced center-of-peak accuracy, sample adjuster 78 is configured to identify fewer of the samples defining each peak as active samples. For example, to maximize the mass resolution, sample adjuster 78 should be configured to identify only one of the samples defining the peak as an active sample, as described above. However, to enhance center-of-peak accuracy in the mass spectrum at the expense of reduced mass resolution, sample adjuster 78 should be configured to identify more than one of the samples defining the peak as active samples. For example, to maximize center-of-peak accuracy at the expense of reduced mass resolution, sample adjuster 78 should be configured to identify as active samples a number of the samples defining the peak equal to the above-described threshold number. Moreover, sample adjuster 78 may be configured to identify as active samples a number of samples defining each peak selected to provide a compromise between mass resolution and center-of-peak accuracy.

The number of samples per peak identified as active samples and, therefore, allowed by the sample adjuster 78 to pass unsuppressed is predefined in at least some embodiments. For example, a user may specify such number prior to the mass spectrum measurement process being performed. Alternatively, the sample adjuster 78 may have a default number of samples that it selects as active samples unless the user specifies a different number. In another embodiment, the sample adjuster 78 is hard coded to allow a certain number of samples to pass unsuppressed for each peak. Other techniques for controlling which samples are suppressed and unsuppressed are possible in other embodiments.

Regardless of the number of samples that sample adjuster 78 is configured to identify as active samples for a given peak, it is generally desirable for the samples having the highest values to be so identified. For example, if only one sample is to be identified as the active sample for a peak and, therefore, to remain unsuppressed, then it is desirable for the identified sample for the peak to be the sample with the highest value (i.e., the maximum sample for the peak). If three samples are to be identified as active samples for a peak, then it is again desirable for the identified samples for the peak to be the samples with the highest values. Ensuring that the highest-value samples are identified as the active samples generally increases the accuracy of the mass spectrum defined by the accumulated samples stored in memory 29.

In a practical example of the choice of the number of samples identified as active samples, a good compromise between mass resolution and center-of-peak accuracy was obtained by identifying the three highest-value ones of the samples representing the peak as the active samples. However, if the two highest-value samples were equal in value, then four samples were identified, with the two highest-value samples constituting the middle two samples.

Until recently, the performance of the ion accelerator composed of ion source 11, electrode 12 and pulse source 17 has limited the mass resolution of practical examples of embodiments of mass spectrometer 50 in which the active samples were identified as just described. However, recent improvements in the precision of the ion accelerator require commensurate improvements in the mass resolution of the ion detection system without the reduction in the center-of-peak accuracy that reducing the number of active samples would entail. The samples identified by sample adjuster 78 as active samples constitute a subset of the samples defining a peak in the mass scan signal.

Figure 10:
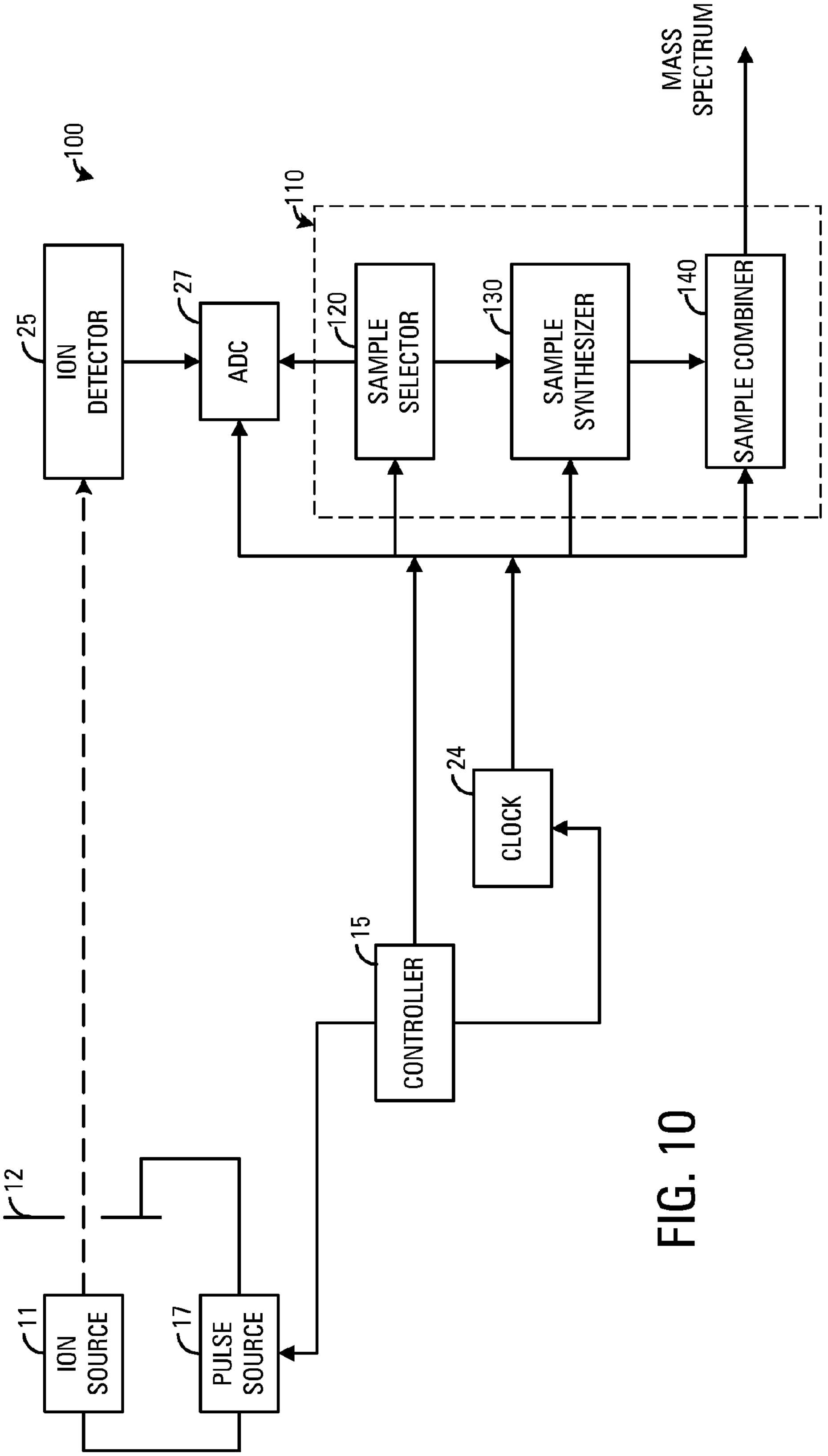
FIG. 10 is a block diagram showing an example of a mass spectrometer in accordance with an embodiment of the invention.

FIG. 10 is a block diagram showing an example of a time-of-flight mass spectrometer 100 in accordance with an embodiment of the invention. To simplify the description of FIG. 10 and subsequent drawings, elements functionally analogous to elements described above with reference to FIGS. 1 and 5 have the same reference numerals and will not be described again in detail.

In the example shown in FIG. 10, mass spectrometer 100 is composed of ion source 11, controller 15, pulse source 17, clock 24, ion detector 25, A/D converter 27, and a sample processor 110. Sample processor 110 is composed of a sample selector 120, a sample synthesizer 130 and a sample combiner 140. In mass spectrometer 100, A/D converter 27 is connected to receive the ion detection signal from ion detector 25 and is operable in a manner similar to that described above to convert the analog ion detection signal received from ion detector 25 during a mass scan operation to a temporal sequence of original samples that will be referred to herein as a mass scan signal. An original sample is a digital sample. A/D converter 27 has a sampling rate that defines the temporal resolution of the original samples. The mass scan signal comprises sets of original samples defining respective peaks. In a minimalist example, the mass scan signal comprises a set of original samples defining a peak. Sample selector 120 is operable to select, from the mass scan signal comprising the original samples defining the peak, a subset of the original samples defining the peak. Sample selector 120 outputs the selected samples to sample synthesizer 130. Sample synthesizer 130 is operable to generate one or more synthesized samples from the subset of the original samples selected by sample selector 120. A synthesized sample is a digital sample. The one or more synthesized samples provide a temporal resolution greater than the temporal resolution of the original samples. Sample combiner 140 is operable to sum the one or more synthesized samples with respective temporally-aligned accumulated samples to produce a mass spectrum. An accumulated sample is a digital sample. The accumulated samples are generated by sample selector 120, sample synthesizer 130 and sample combiner 140 from mass scan signals generated during respective previously-performed mass scan operations.

Figure 11:
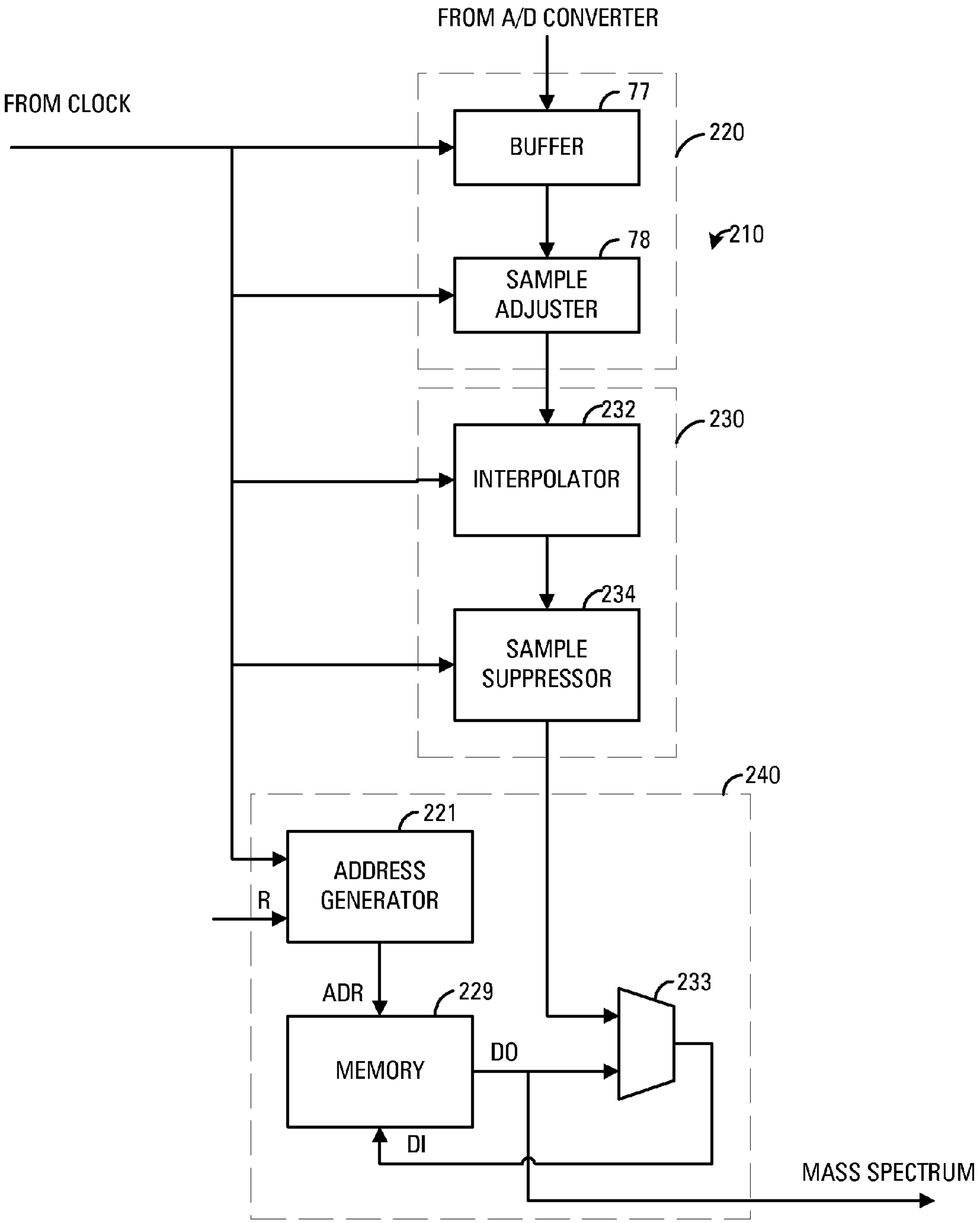
FIG. 11 is a block diagram showing an example of a first embodiment of the sample processor of the mass spectrometer shown in FIG. 10.

FIG. 11 is a block diagram showing an example of one embodiment 210 of sample processor 110 in which the sample synthesizer subjects the original samples in the subset to interpolation to generate the synthesized samples that provide a greater temporal resolution than the original samples. In the example shown, sample processor 210 is composed of a sample selector 220, a sample synthesizer 230 and a sample combiner 240.

Sample selector 220 identifies each peak defined by the original samples constituting the mass scan signal output by A/D converter 27, and selects from the mass scan signal for output to sample synthesizer 230 a respective subset of the original samples defining the peak. The subset of original samples is composed of a predetermined number of the original samples and will be referred to herein as an original subset. In an example, for each peak identified in the mass scan signal, sample selector 220 selects an original subset composed of three original samples unless two of the original samples in the subset are equal in value. When two of the original samples are equal in value, sample selector 220 selects an original subset composed of four active samples, as described above. Alternatively, the number of samples in the original subset is determined adaptively in response to the amplitude of the maximum-amplitude sample in the original subset.

In the example shown, sample selector 220 is composed of buffer 77 and sample adjuster 78 described above with reference to FIGS. 5 and 6. The active samples output by sample adjuster 78 for each peak identified in the mass scan signal constitute the original subset of the original samples defining the peak selected by sample selector 220. In other examples, sample selector 220 is composed of elements different from buffer 77 and sample adjuster 78, and is operable to identify each peak defined by the original samples constituting the mass scan signal output by A/D converter 27, and to select for output to sample synthesizer 230 a respective original subset of the original samples defining the peak.

The example of sample synthesizer 230 shown in FIG. 11 is composed of an interpolator 232 and a sample suppressor 234. For each peak identified by sample selector 220 in the mass scan signal, interpolator 232 receives from sample selector 220 the original subset of the original samples defining the peak. Sample synthesizer 220 subjects the original samples within the original subset to interpolation to generate the synthesized samples and adds the synthesized samples to the original subset to generate an augmented subset. In the augmented subset, at least one of the synthesized samples is interposed between two adjacent ones of the original samples. In one example, a single synthesized sample is interposed between two adjacent ones of the original samples. In another example, two or more synthesized samples are interposed between two adjacent ones of the original samples.

Sample synthesizer 230 passes the augmented subset of samples composed of the original samples received from sample selector 220 and the synthesized samples generated by sample synthesizer 230 to sample suppressor 234. Sample suppressor 234 suppresses at least one of the original samples in the augmented subset to generate a truncated subset having a smaller temporal span than the original subset of original samples output by sample selector 210. The temporal span of a subset is the time difference between the earliest sample and the latest sample in the subset. The temporal order of the original samples is the order in which the original samples were generated by A/D converter 27. The at least one original sample that is suppressed is a temporarily-extreme one of the original samples in the augmented subset. In other words, the at least one original sample that is suppressed is either or both of the earliest original sample and the latest original sample in the augmented subset. In some embodiments, at least one of the synthesized samples in the augmented subset is additionally suppressed. Sample suppressor 234 outputs the truncated subset to sample combiner 240.

The example of sample combiner 240 shown is composed of a memory address generator 221, a memory 229 and a summer 233. A first input of summer 233 is connected to receive the samples in each truncated subset from the output of sample synthesizer 230. Memory address generator 221, memory 229 and summer 233 are interconnected in an arrangement similar to that of memory address generator 21, memory 29 and summer 33 described above with reference to FIGS. 1 and 5, i.e., the data output DO of memory 229 is connected to a second input of summer 233, and the output of summer 233 is connected to the data input DI of memory 229. Memory 229 additionally has an address input ADR connected to receive the memory address generated by memory address generator 221. In one embodiment, sample suppressor 234 outputs the samples constituting the truncated subset serially, memory 229 and summer 233 have a data width equal to that of the original samples, and memory address generator 221, memory 229 and summer 233 operate a rate of n times that of the conversion clock signal generated by clock 24, where n is the denominator of the temporal offset between an original sample and an adjacent synthesized sample in the augmented subset expressed as a fraction of the period of the conversion clock. In this case, the range of memory addresses generated by memory address generator 221 for a given mass range is n times that generated by memory address generator 21. In another embodiment, sample suppressor 234 outputs the samples constituting the truncated subset in parallel, memory 229 and summer 233 have a data width equal to n times that of the original samples, memory address generator 221, memory 229 and summer 233 operate a rate equal to that of the conversion clock signal generated by clock 24. In this case, the range of memory addresses generated by memory address generator 221 for a given mass range is equal to that generated by memory address generator 21, but each memory location is n times as wide. In another embodiment, a combination of a wider data width (e.g., $\sqrt{n}$ times that of the original samples) and a higher operational rate (e.g., $\sqrt{n}$ times that of the conversion clock) is used. In all such embodiments, for a given mass range, memory 229 is n times larger than memory 29.

In some embodiments, the size of memory 229 is limited by the amount of memory available in an application-specific integrated circuit (ASIC) used to implement the circuitry downstream of A/D converter 27 so that the size of memory 229 may be no larger than that of memory 29 of mass spectrometer 50 described above with reference to FIG. 5. Memory 29 has only one, single-width memory location per conversion clock period. In embodiments of mass spectrometer 100 in which the size of memory 229 is the same as that of memory 29, the mass range that can be detected is $1/\sqrt{n}$ of that of mass spectrometer 50 because n memory locations are needed per conversion clock period or each memory location is n times as wide.

Prior to the beginning of each mass scan operation performed by mass spectrometer 100, controller 15 provides a reset signal to a reset input R of address generator 221. The reset signal sets the memory address output by address generator 221 to zero or another predetermined value. Then, during the following mass scan, address generator 221 counts the conversion clock signal generated by clock 24 to generate a respective memory address. In an embodiment in which sample suppressor 234 outputs the samples in the truncated subset serially, address generator 221 generates n memory addresses for each of the samples output by A/D converter 27 during the mass scan operation. The n memory addresses are typically consecutive. In an embodiment in which sample suppressor 234 outputs the samples in the truncated subset in parallel, address generator 221 generates a respective single memory address for each of the samples output by A/D converter 27 during the mass scan operation.

Summer 233 sums each of the samples in the truncated subset received from sample suppressor 234 with a respective temporally-aligned accumulated sample read from memory 229 to generate a new accumulated sample that is stored in memory 229. Specifically, in an embodiment in which sample suppressor 234 outputs the samples in each truncated subset serially, the accumulated sample is read from a memory location in memory 229 specified by the current memory address generated by memory address generator 221. Summer 233 sums the current sample received from sample suppressor 234 with the accumulated sample read from memory 220 to generate a new accumulated sample. The current sample is a synthesized sample or an original sample. The new accumulated sample is then written back in memory 229 at the memory location specified by the current memory address received from memory address generator 221. The process just described is repeated for each of the samples (i.e., each of the original samples and each of the synthesized samples) in the truncated subset output by sample suppressor 234. Reading the accumulated sample from a memory location in memory 229 specified by the value of the memory address generated by memory address generator 221 when summer 223 receives the current sample from sample suppressor 234 and writing the new accumulated sample at the same memory location in memory 229 provides the temporal alignment between the current sample and the accumulated sample with which the current sample is summed. The memory address generated by memory address generator 221 increments after each new accumulated sample has been written back in memory 229.

In an embodiment in which sample suppressor 234 outputs n of the samples constituting each truncated subset in parallel, a block of n accumulated samples is read from a memory location in memory 229 specified by the current memory address generated by memory address generator 221. In implementations in which the number of samples in the truncated subset is less than or equal to n, sample suppressor 234 outputs all of the samples in the truncated subset in a single period of the conversion clock. In implementations in which the number of samples in the truncated subset is more than n, sample suppressor 234 requires two or more periods of the conversion clock to output all of the samples in the truncated subset. Some of the n samples output in parallel by sample suppressor may be suppressed samples having a value of zero. Summer 233 sums the n samples received from sample suppressor 234 with the block of n accumulated samples read from memory 229 to generate a block of n new accumulated samples. The block of new accumulated samples is then written back in memory 229 at the memory location specified by the current memory address received from memory address generator 221. In embodiments in which the number of samples in the truncated subset is greater than n, the process just described is repeated in the next period of the conversion clock to subject the remaining samples in the truncated subset to accumulation. The process just described generates a respective new accumulated sample from each of the samples (i.e., each of the original samples and each of the synthesized samples) in the truncated subset of samples output by sample suppressor 234. Reading the block of accumulated samples from a memory location in memory 229 specified by the value of the memory address generated by memory address generator 221 when summer 223 receives the n samples from sample suppressor 234 and writing the block of new accumulated samples at the same memory location in memory 229 provides the temporal alignment between each sample received from sample suppressor 234 and the respective accumulated sample with which the sample is summed. The memory address generated by memory address generator 221 increments after each block of new accumulated samples has been written back in memory 229.

In both of the serial and parallel embodiments described above, the read function of memory 229 is inhibited during the first mass scan operation in each mass spectrum measurement process. Inhibiting the read function causes memory 229 to output a value of zero at its data output DO. Consequently, each sample received from sample suppressor 234 effectively overwrites any residual accumulated sample stored in memory 229 during the first mass scan operation. Alternatively, instead of inhibiting the read function of memory 229 during the first mass scan operation, a gate is interposed between the data output DO of memory 229 and the second input of summer 233 to supply a value of zero to the second input of summer 233 only during the first mass scan operation. In a further alternative, a value of zero is stored in each memory location in memory 229 at the start of each mass spectrum measurement process, which makes it unnecessary to inhibit the read function of memory 229 during the first mass scan operation.

Successive mass scan operations accumulate in memory 229 a raw mass spectrum of progressively increasing accuracy. When the raw mass spectrum accumulated in memory 229 achieves a specified accuracy, a processor (not shown) reads the raw mass spectrum from memory 229 and subjects each peak exhibited by the raw mass spectrum to a centroid calculation to determine the time value represented by the peak. The processor then converts the time value represented by each peak to a corresponding mass using the time-to-mass conversion equation described below.

Figure 12A:
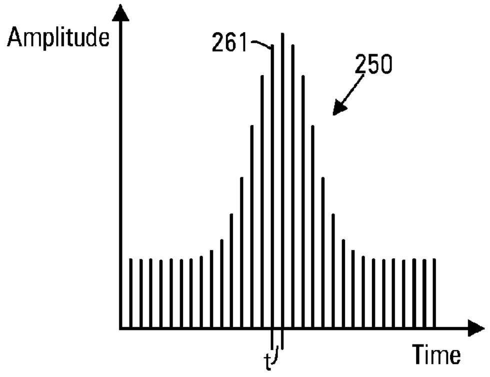
FIGS. 12A-12F are graphs illustrating the operation of the sample processor shown in FIG. 11.

Operation of an example of sample processor 210 will now be described with reference to FIGS. 12A-12F. FIG. 12A shows part of the mass scan signal output by A/D converter 27 during a mass scan operation. The mass scan signal is composed of a temporal sequence of original samples. In the part of the mass scan signal shown, the original samples define a peak 250. An exemplary original sample is shown at 261. FIG. 12A is similar to FIG. 3A except that the original samples constituting the mass scan signal are represented by vertical bars rather than by points.

Figure 12B:
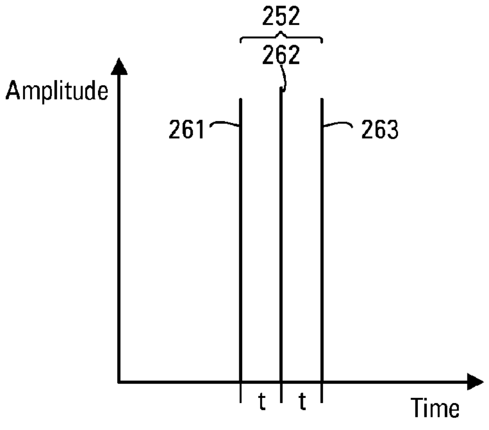

FIG. 12B shows an original subset 252 of the original samples that define peak 250 output to sample synthesizer 232 by sample selector 220. The time axes of FIGS. 12B-12F are expanded relative to the time axis of FIG. 12A to enable the synthesized samples and the original samples from which they are derived to be shown more clearly. In the example shown, original subset 252 is composed of three original samples 261, 262, 263. In other examples, original subset 252 is composed of more or fewer original samples. In the example shown in FIG. 12B, on the time axis, each original sample 262, 263 in original subset 252 is separated from the previous original sample 261, 262, respectively, by one period t of the conversion clock.

Interpolator 232 receives original samples 261-263 constituting original subset 252 and performs an interpolation operation that generates synthesized samples 264 and 265. Interpolator 232 adds synthesized samples 264 and 265 to original subset 252 to form an augmented subset 254 composed of five samples. In the example shown, interpolator 232 has subject original samples 261-263 to linear interpolation to generate synthesized samples 264 and 265 shown in FIG. 12C. In other examples, interpolator 232 subjects samples 261-263 to polynomial interpolation, to spline interpolation or to a curve fitting operation to generate the synthesized samples.

Figure 12C:
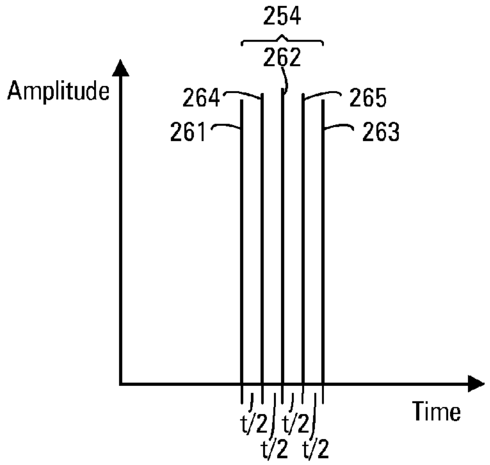

In the example shown in FIG. 12C, on the time axis, each original sample 262, 263 in augmented subset 254 remains separated from the previous original sample 261, 262, respectively, by one period t of the conversion clock signal. Additionally, in augmented subset 254, synthesized sample 264 is separated from original sample 261 by one half t/2 of one period of the conversion clock signal, and synthesized sample 265 is separated from original sample 262 by one half t/2 of one period of the conversion clock signal. With the addition of synthesized samples 264, 265 shown in FIG. 12C, the samples constituting augmented subset 254 have a temporal resolution twice that the original samples constituting subset 252 shown in FIG. 12B, and the denominator n of the temporal offset t/2 between the original samples and respective adjacent synthesized samples in augmented subset 254 is equal to 2.

Figure 12D:
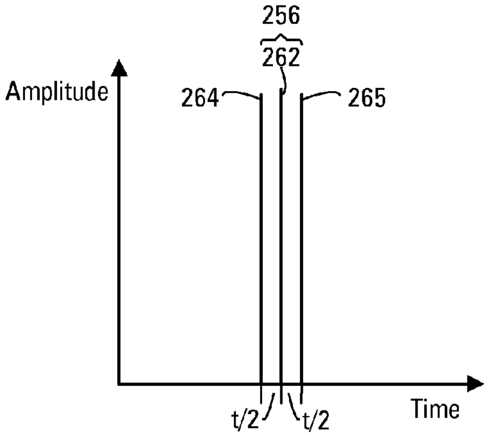

Interpolator 232 outputs augmented subset 254 composed of original samples 261-263 and synthesized samples 264, 265 to sample suppressor 234. Sample suppressor 234 suppresses at least one of the temporally-extreme ones of the samples 261-265 constituting augmented subset 254 to generate a truncated subset 256 having a smaller temporal span than original subset 252. In the example shown, sample suppressor 234 suppresses the earliest original sample 261 and the latest original sample 263 in augmented subset 254. Original samples 261 and 263 are earliest and latest in the order in which original samples 261-263 were generated by A/D converter 27. Suppressing original samples 261 and 263 generates truncated subset 256 of samples composed of, in temporal order, synthesized sample 264, original sample 262 and synthesized sample 265, as shown in FIG. 12D. It can be seen by comparing FIG. 12D with 12B that, whereas in original subset 252 shown in FIG. 12B, the latest sample 263 was two conversion clock signal periods later than the earliest sample 261, in truncated subset 254, the latest sample 265 is only one conversion clock signal period later than the earliest sample 264. Consequently, samples 264, 262 and 265 constituting truncated subset 254, when combined by sample combiner 240 with the respective temporally-aligned accumulated samples stored in memory 229 add to the raw mass spectrum stored in memory 229 information regarding the shape of peak 250 having a temporal resolution twice that of original samples 261-263 that defined peak 250.

Figure 12E:
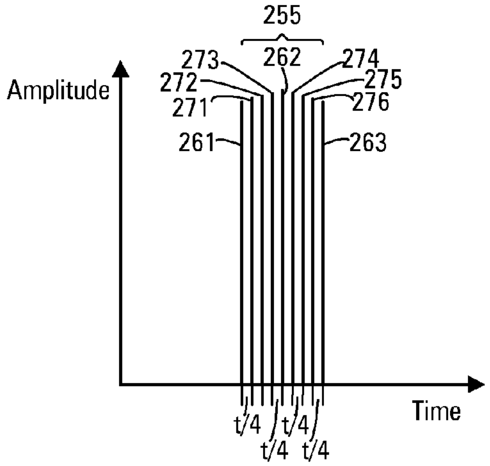
Figure 12F:
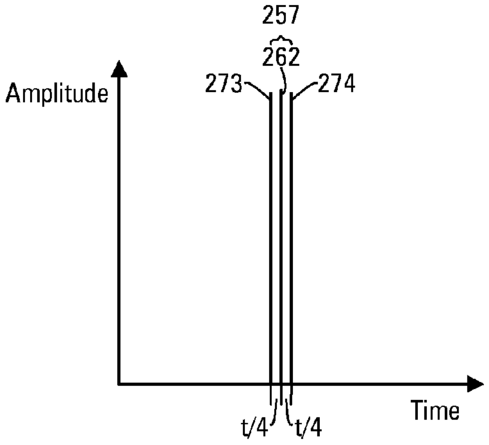

Another example of the operation of sample processor 210 is shown in FIGS. 12E and 12F. In the example shown in FIG. 12E, interpolator 232 has interposed three synthesized samples 271, 272, 273 between original samples 261, 262, and has interposed three synthesized samples 274, 275, 276 between original samples 262, 263. Interpolator 232 has added synthesized samples 271-276 to original subset 252 to form an augmented subset 255. Within augmented subset 255, synthesized samples 271, 272, 273 are respectively separated from original sample 261 by one quarter (t/4), one half, and three quarters of one period of the conversion clock signal generated by clock 24, and synthesized samples 274, 275, 276 are respectively separated from original sample 262 by one quarter, one half and three quarters of one period of the conversion clock signal. Thus, with the addition of synthesized samples 271-276, the samples constituting augmented subset 255 have a temporal resolution four times that of the original samples 261-263 constituting original subset 252, and the denominator n of the temporal offset t/4 between the original samples and respective adjacent synthesized samples in augmented subset 255 is equal to 4.

In the example shown in FIG. 12F, sample suppressor 234 suppresses the earliest original sample 261, the earliest synthesized samples 271, 273, the latest synthesized samples 275, 276, and the latest original sample 263 in augmented subset 255 to form a truncated subset 257. Original samples 261 and 263 are the earliest and the latest original samples in the order in which original samples 261-263 were generated by A/D converter 27. Synthesized samples 271, 272 and 275, 276 are the earliest two and the latest two synthesized samples in the order in which the synthesized samples 264-267 were generated by interpolator 232. Suppressing original samples 261 and 263 and synthesized samples 271, 272, 275 and 276 generates a truncated subset 257 of samples composed of, in temporal order, synthesized sample 273, original sample 262 and synthesized sample 274, as shown in FIG. 12F. It can be seen by comparing FIG. 12F with FIG. 12B that, whereas in original subset 252 shown in FIG. 12B, the latest sample 263 was two conversion clock signal periods later than the earliest sample 261, in truncated subset 257, the latest sample 274 is only one half of one conversion clock signal period later than the earliest sample 273. Consequently, samples 273, 262 and 274 constituting truncated subset 257, when combined by sample combiner 240 with the respective temporally-aligned accumulated samples stored in memory 229, add to the raw mass spectrum stored in memory 229 information regarding the shape of peak 250 having a higher temporal resolution than that of original samples 261-263 that defined peak 250.

In an alternative embodiment, in FIG. 12E, interpolator 232 generates only the synthesized samples 273 and 274 that constitute part of truncated subset 257 output by sample suppressor 234. In such embodiment, the operation of sample suppressor 234 is simplified because sample the suppressor suppresses no synthesized samples, and suppresses only temporally-extreme original samples 261 and 263. In an example similar to that shown in FIG. 12E, interpolator 232 generates only synthesized samples 273 and 274 with respective timing offsets of plus and minus t/4 relative to the timing of original sample 262. Consequently, the augmented subset output by interpolator 232 is composed of original samples 261, 262 and 263, and synthesized samples 273 and 274 in an irregular temporal order 261, 273, 262, 274, 263. Sample suppressor 234 then suppresses only original samples 261 and 263 to generate truncated subset 257 composed of original sample 262 and synthesized samples 273 and 274 in a regular temporal order 273, 262, 274.

In the example described above with reference to FIGS. 12C and 12D, the samples in each truncated subset have a temporal resolution twice that and, hence, a mass resolution √2 times that, of the original samples output by A/D converter 27. In the example described above with reference to FIGS. 12E and 12F, the samples in each truncated subset have a temporal resolution four times that and, hence, a mass resolution twice that, of the original samples. In each mass scan operation except the first, the samples in the truncated subsets output by sample synthesizer 230 are added to respective temporally-aligned accumulated samples stored in memory 229 to generate a raw mass spectrum whose accuracy progressively increases as the number of mass scan operations performed increases. The temporal resolution, and, hence, mass resolution, of the raw mass spectrum generated by mass spectrometer 100 is greater than the temporal resolution and mass resolution of the raw mass spectrum generated from the same number of mass scan operations by an embodiment of mass spectrometer 50 having the same conversion clock frequency by respective resolution ratios somewhat less than the above-described resolution ratios between the samples in the truncated subset and the original samples. Once sufficient mass scan operations have been performed to obtain a raw mass spectrum of a specified accuracy, the accumulated samples defining each peak in the raw mass spectrum are subject to a centroid calculation as described above to determine the time value represented by the peak, and the time value is converted to a mass value.

Figure 13:
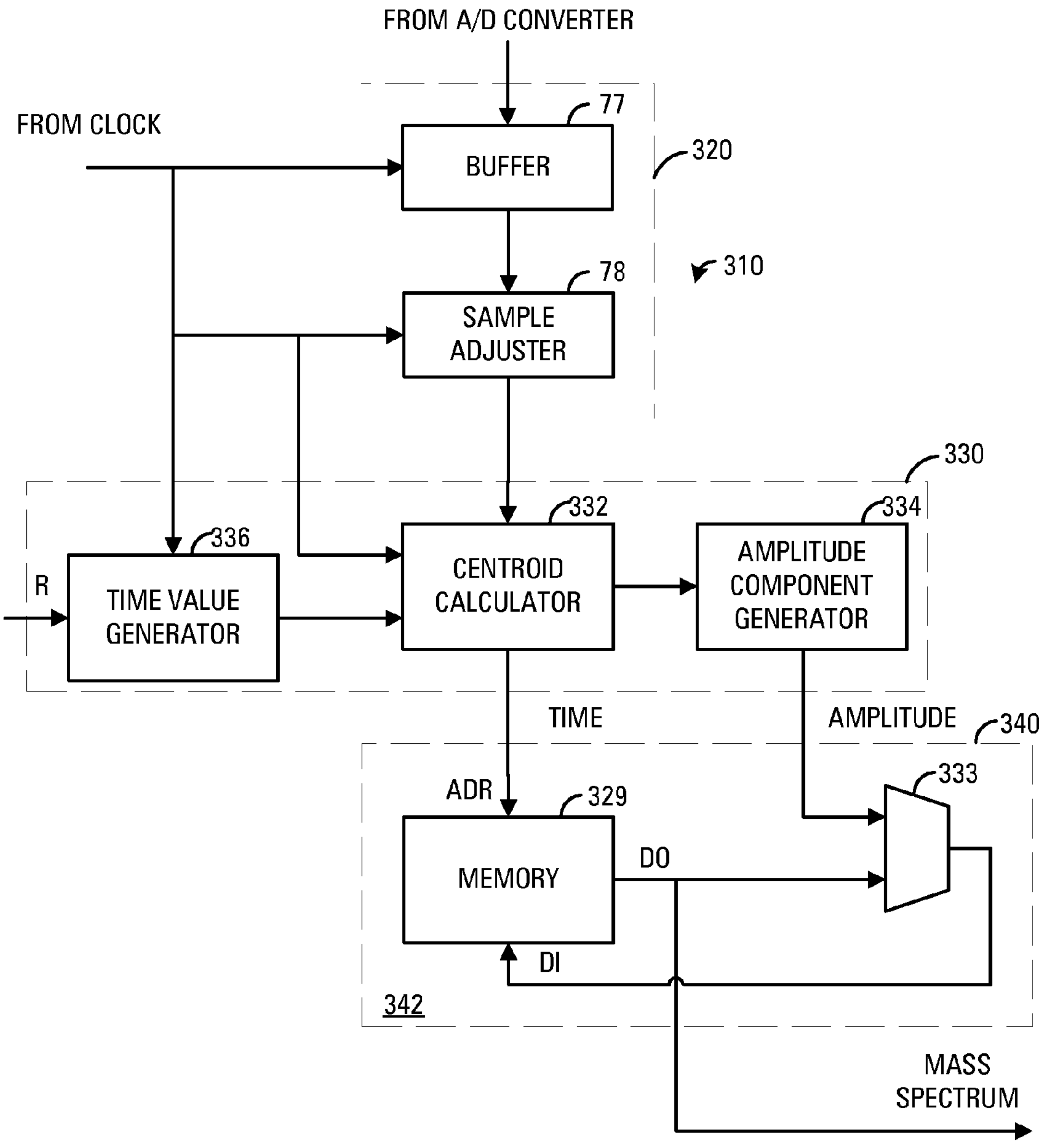
FIG. 13 is a block diagram showing a first example of a second embodiment of the sample processor of the mass spectrometer shown in FIG. 10.

FIG. 13 is a block diagram showing a first example of another embodiment 310 of sample processor 110 shown in FIG. 10 in which the sample synthesizer subjects the original samples in the subset to a centroid calculation to generate the time component of a single synthesized sample having a time component and an amplitude component. The time component of the single synthesized sample provides a greater temporal resolution than the original samples. In the example shown, sample processor 310 is composed of a sample selector 320, a sample synthesizer 330 and a first example 342 of a sample combiner 340. Sample combiner 340 includes a memory 329. In a manner similar to that of sample selector 220 described above with reference to FIG. 11, sample selector 320 identifies each peak defined by the original samples constituting the mass scan signal output by A/D converter 27 and selects from the mass scan signal a subset of the original samples defining the peak for output to sample synthesizer 330. The subset is composed of a predetermined number of the original samples and will be referred to herein as an original subset. The number of samples constituting the original subset output by sample selector 320 is typically larger than the number of original samples constituting the original subset output by sample selector 220 described above with reference to FIG. 11. Alternatively, the number of samples in the original subset is determined adaptively in response to the amplitude of the maximum-amplitude sample in the subset. In the example shown, sample selector 320 is composed of buffer 77 and sample adjuster 78 described above with reference to FIGS. 5, 6 and 11. The active samples output by sample adjuster 78 for each peak identified in the mass scan signal constitute the original subset of the original samples defining the peak. In other examples, the sample selector is composed of circuit elements different from buffer 77 and sample adjuster 78, and that collectively perform functions that are the same as or equivalent to those described above.

The example of sample synthesizer 330 shown is composed of a centroid calculator 332, an amplitude component generator 334 and a time value generator 336. Each of centroid calculator 332 and amplitude component generator 334 receives each original subset of original samples output by sample selector 320 and additionally receives corresponding time values from time value generator 336. Amplitude component generator 334 receives each original subset of original samples output by sample selector 320 either directly, or indirectly via centroid calculator 332, as shown. Amplitude component generator 334 outputs the amplitude component of each synthesized sample to sample combiner 340.

Referring additionally to FIG. 10, prior to the beginning of each mass scan performed by mass spectrometer 100, controller 15 provides a reset signal to a reset input R of time value generator 336. The reset signal sets the time value output by time value generator 336 to zero or another predetermined value. Then, during the following mass scan operation, time value generator 336 counts the conversion clock signal generated by clock 24 to generate a time value for each of the original samples output by A/D converter 27 during the mass scan. Time value generator 336 outputs each time value it generates to centroid calculator 332.

In another embodiment, a mass value converter (not shown) is interposed between time value generator 336 and centroid calculator 332. The mass value converter converts each time value t generated by time value generator 336 to a respective mass value m by subjecting the time value to processing in accordance with the following mass conversion equation:

$$m = \left(\frac{t-c}{k}\right)^2,$$

where c and k are constants. Alternatively, the mass value converter can perform the mass conversion using a look-up table. The mass value converter outputs the respective mass value to centroid calculator 332 instead of the time value output by time value generator 336. In embodiments in which time value generator 336 is followed by a mass converter, the term mass value should be substituted for the term time value in the description set forth below.

In an embodiment in which no mass value converter is interposed between time value generator 336 and centroid calculator 332, centroid calculator 332 associates each original sample in the original subset received from sample selector 320 with its respective time value to produce a respective two-dimensional sample. The two-dimensional sample has an amplitude component contributed by the amplitude represented by the original sample and a time component contributed by the time value received from time value generator 336. The two dimensional samples generated from the original samples in the original subset constitute an augmented subset. Centroid calculator 332 discards time values corresponding to the original samples suppressed by sample selector 320.

Centroid calculator 332 subjects the two-dimensional samples in the augmented subset to a centroid calculation to determine the time coordinate of the centroid of the peak represented by the original samples in the original subset. In this disclosure, references to the centroid of a peak are to be regarded as referring to only to the time coordinate (or mass coordinate) of the centroid. Thus, the centroid calculation generates only a single result indicating a time (or a mass if each two-dimensional sample has a mass component instead of a time component). Algorithms for performing a centroid calculation are known in the mass spectrometry art and will therefore not be described here in depth. In one example, the two-dimensional samples in an augmented subset composed of N two-dimensional samples are regarded as defining a polygon having N+2 vertices. The area A of such polygon is given by:

$$A = \frac{1}{2}\sum_{i=0}^{N+1}(t_i a_{i+1} - t_{i+1} a_i),$$

and the coordinate $C_t$ of the centroid of the polygon on the time (or mass) axis is given by:

$$C_t = \frac{1}{6A}\sum_{i=0}^{N+1}(t_i + t_{i+1})(t_i a_{i+1} + t_{i+1} a_i),$$

where $t_i$ and $a_i$ are the coordinates on the time axis and the amplitude axis, respectively, of the i-th vertex of the polygon. The amplitudes represented by the amplitude components of the two-dimensional samples in the subset provide the coordinates of N of the vertices on the amplitude axis, and the time components of the two-dimensional samples provide the coordinates of the N vertices on the time axis. The coordinates of the remaining two vertices on the amplitude axis are zero and the coordinates of the remaining two vertices on the time axis are respectively equal to the time components of the earliest and latest of the two-dimensional samples in the augmented subset. Centroid calculator 332 outputs the coordinate $C_t$ of the centroid on the time axis to sample combiner 342 as the time component of the single synthesized sample generated by sample synthesizer 330. The synthesized sample represents the peak originally represented by the original samples in the original subset. Centroid calculator 332 is configured to calculate time axis coordinate $C_t$ with a temporal resolution greater than the temporal resolution of the original samples generated by A/D converter 27. For example, centroid calculator 332 is configured to calculate time axis coordinate $C_t$ as a binary number having at least one bit more than the binary numbers used to represent the time components of the two-dimensional samples. In an example, centroid calculator calculates the time axis coordinate with a temporal resolution of eight (three bits more than the time values) or sixteen times (four bits more than the time values) the time resolution of the original samples. Other temporal resolutions are possible.

Additionally, in sample synthesizer 330, amplitude component generator 334 receives the original samples in each original subset output by sample selector 320, and from at least one of the original samples generates the amplitude component of the respective synthesized sample. In the example shown, amplitude component generator 334 receives each augmented subset of two-dimensional samples from centroid calculator 332. The original samples in the original subset constitute the amplitude components of the two-dimensional samples in the augmented subset. Consequently, amplitude component generator 334 can be regarded as generating the amplitude component of the synthesized sample from at least one of the original samples in the original subset even when the amplitude component generator receives the original samples as the amplitude components of the two-dimensional samples in an augmented subset. In other examples, amplitude component generator 334 receives each original subset of original samples directly from sample selector 320.

Processes that amplitude component generator 334 may perform to generate the amplitude component of the synthesized sample representing each original subset include processes based on selection and processes based on interpolation. In processes based on selection, one of the original samples in the original subset is selected as the amplitude component of the synthesized sample. In processes based on interpolation, two or more of the original samples in the original subset and their respective time values are subject to interpolation to generate the amplitude component of the synthesized sample.

In one example of a process based on selection, amplitude component generator 334 directly or indirectly receives the original subset of original samples, and selects a predetermined one of the original samples in the original subset for output to sample combiner 342 as the amplitude component of the synthesized sample. For example, the amplitude component generator selects the original sample at the temporal mid-point of the original subset for output to the sample combiner as the amplitude component of the synthesized sample.

In another example of a process based on selection, amplitude component generator 334 directly or indirectly receives the original subset of original samples, and selects the one of the original samples in the original subset having the greatest amplitude as a maximum-amplitude sample for output to sample combiner 342 as the amplitude component of the synthesized sample. Alternatively, the processing performed by sample adjuster 78 identifies the maximum-amplitude sample in each original subset. In this case, amplitude component generator 334 selects the original sample identified by sample adjuster 78 as the maximum-amplitude sample for output to sample combiner 342 as the amplitude component of the synthesized sample.

In another example of a process based on selection, amplitude component generator 334 receives the augmented subset of two-dimensional samples generated by centroid calculator 332, and additionally receives the time component calculated by centroid calculator 332. Amplitude component generator 334 selects the amplitude component of the two-dimensional sample whose time component is closest in value to the time component of the synthesized sample for output to sample combiner 342 as the amplitude component of the synthesized sample. In an example, the time component of the synthesized sample is 5¼, two of the two-dimensional samples have respective time components of 5 and 6, and amplitude component generator 334 selects the amplitude component of the two-dimensional sample having the time component of 5 for output to the sample combiner as the amplitude component of the synthesized sample. The time component of the selected two-dimensional sample is closest in value to the time component of the synthesized sample. Amplitude component generator 334 is additionally configured to determine which two-dimensional sample to select in the event that the time component of the synthesized sample equally close to the time components of two of the two-dimensional samples. Circuitry and algorithms for selecting and outputting one of a subset of original samples in accordance with a selection criterion are known in the art and will therefore not be described in detail here.

In an example of a process based on interpolation, amplitude component generator 334 subjects the two-dimensional samples in the augmented subset to interpolation to generate the amplitude component of the synthesized sample. Specifically, amplitude component generator receives the augmented subset of two-dimensional samples generated by centroid calculator 332 and additionally receives the time component calculated by centroid calculator 332. Amplitude component generator 334 subjects two or more of the two-dimensional samples in the augmented subset to interpolation to generate a new two-dimensional sample whose amplitude component is calculated by the interpolation process and whose time component is equal to the time component calculated by centroid calculator 332. Amplitude component generator 334 outputs the amplitude component of the new two-dimensional sample to sample combiner 342 as the amplitude component of the synthesized sample. Alternatively, amplitude component generator 334 outputs the entire new two-dimensional sample to sample combiner 342 as the synthesized sample. In this case, the time component of the synthesized sample is output to sample combiner 342 by amplitude component generator 334 instead of by centroid calculator 332 as shown in FIG. 13.

Amplitude component generator 334 may use such interpolation processes as linear interpolation, spline interpolation, polynomial interpolation and curve fitting. Circuitry and algorithms for subjecting two or more two-dimensional samples in an augmented subset to interpolation to generate a new two-dimensional sample whose amplitude component is calculated by the interpolation process are known in the art and will therefore not be described in detail here.

The synthesized sample generated by sample synthesizer 330 has an amplitude component and a time (or mass) component as just described, and represents the peak in the mass scan signal defined by the subset of original samples selected by sample selector 320. Sample combiner 342 receives the synthesized sample from sample synthesizer 330 in lieu of the original samples selected by sample selector 320. Sample combiner 342 receives none of the original samples generated by A/D converter 27.

The example 342 of sample combiner 340 shown in FIG. 13 is composed of a memory 329 and a summer 333 connected to one another in an arrangement similar to that of memory 29 and summer 33 described above with reference to FIGS. 1 and 5, i.e., the data output DO of memory 329 is connected to the second input of summer 333, and the output of summer 333 is connected to the data input DI of memory 329. Memory 329 additionally has an address input ADR connected to receive the time component of the synthesized sample generated by sample synthesizer 330. Specifically, the address input ADR of memory 329 is connected to the output of centroid calculator 332 in sample synthesizer 330. The first input of summer 333 is connected to receive the amplitude component of the synthesized sample generated by sample synthesizer 330. Specifically, the first input of summer 333 is connected to the output of amplitude component generator 334 in sample synthesizer 330. At the beginning of each mass spectrum measurement operation, a value of zero is stored in each memory location in memory 329 as an initial accumulated sample. Alternatively, the read function of memory 329 is inhibited the first time during the mass spectrum measurement process that a read attempt is made at a given memory location.

Sample combiner 342 combines the synthesized samples received from sample synthesizer 330 with respective temporally-aligned accumulated samples to produce respective new accumulated samples that collectively constitute a raw mass spectrum. The accumulated samples are generated by sample selector 320, sample synthesizer 330 and sample combiner 340 from mass scan signals generated during respective previously-performed mass scan operations. Specifically, for each synthesized sample received from sample synthesizer 330, the time component of the synthesized sample specifies an address in memory 329 where an accumulated sample is stored. Memory 329 performs a read operation in which the accumulated sample stored at the address specified by the time component of the synthesized sample is output to summer 333. Summer 333 sums the accumulated sample read from memory 329 with the amplitude value of the synthesized sample received from sample synthesizer 330 to generate a new accumulated sample that is output to memory 329. Memory 329 then performs a write operation in which the new accumulated sample received from summer 333 is stored at the address specified by the time component of the synthesized sample. Reading the accumulated sample from a location in memory 329 specified by the time component of the current synthesized sample generated by sample synthesizer 330 and writing the new accumulated sample at the same location in memory 329 provides the temporal alignment between the synthesized sample and the accumulated sample with which the synthesized sample is summed.

The synthesized samples generated in successive mass scan operations accumulate in memory 329 to produce a raw mass spectrum having a progressively increasing accuracy. When the raw mass spectrum accumulated in memory 329 achieves a specified accuracy, a processor (not shown) reads the raw mass spectrum from memory 329 and subjects each peak exhibited by the raw mass spectrum to a centroid calculation to determine the time value represented by the peak. The processor then converts the time value represented by each peak to a corresponding mass using the time-to-mass conversion equation described above. This last calculation is unnecessary in embodiments in which a mass value converter is interposed between time value generator 336 and centroid calculator 332, as described above.

Figure 14A:
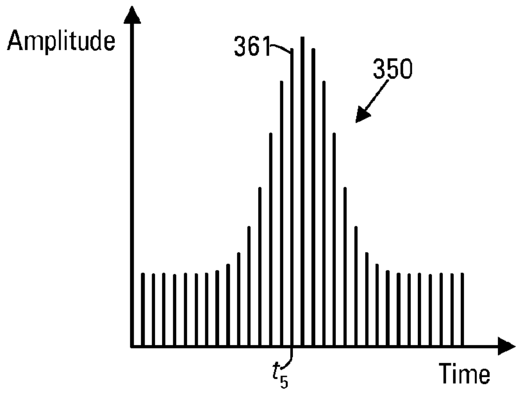
FIGS. 14A-14D are graphs illustrating the operation of the sample processor shown in FIG. 13.

Operation of an example of sample processor 310 will now be described with reference to FIGS. 14A-14D. FIG. 14A shows part of the mass scan signal output by A/D converter 27 during a mass scan operation. The mass scan signal is composed of a temporal sequence of original samples. In the part of the mass scan signal shown, the original samples define a peak 350. An exemplary original sample is shown at 361.

Figure 14B:
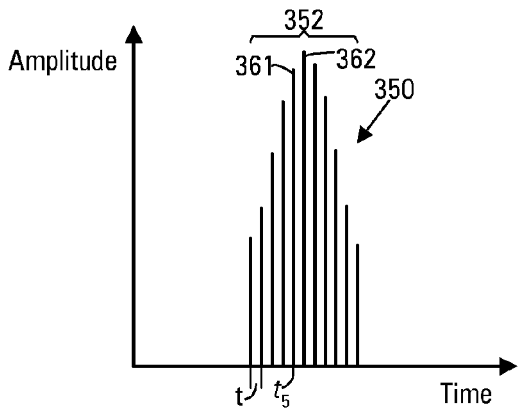

FIG. 14B shows an original subset 352 of the original samples defining peak 350 output to sample synthesizer 330 by sample selector 320. In the example shown, original subset 352 is composed of eleven original samples. In other examples, original subset 352 is composed of more or fewer original samples. In the example shown in FIG. 14B, on the time axis, each original sample in original subset 352 is separated from the previous original sample by one period t of the conversion clock signal.

Figure 14C:
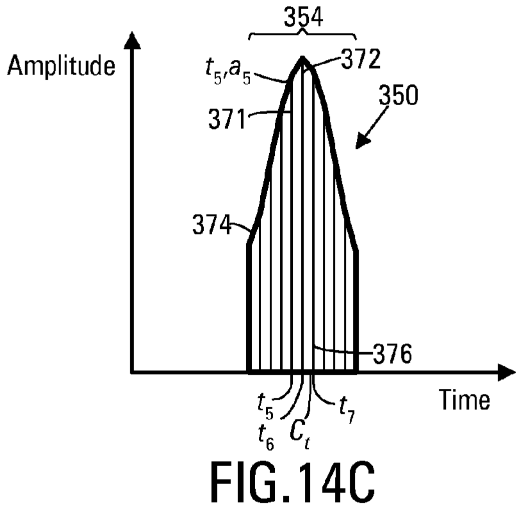

In sample synthesizer 330, centroid calculator 332 receives the original samples constituting original subset 352 from sample selector 320 and associates each original sample in the original subset with its respective time value to generate a respective two-dimensional sample having an amplitude component contributed by the amplitude represented by the original sample and a time component contributed by the respective time value received from time value generator 336. For example, original sample 361 is associated with its respective time value $t_5$ to generate a two-dimensional sample 371 having an amplitude component $a_5$ equal to the amplitude represented by original sample 361 and a time component $t_5$ equal to the time value received from time value generator 336 for original sample 361, as shown in FIG. 14C. The two-dimensional samples having amplitude components contributed by a respective one of the original samples constituting original subset 352 collectively constitute an augmented subset 354.

Centroid calculator 332 additionally subjects the two-dimensional samples constituting augmented subset 354 to a centroid calculation to determine the time axis coordinate $C_t$ of the centroid of the peak represented by the two-dimensional samples in the augmented subset. In the example shown, amplitude components and the time components of the two-dimensional samples in augmented subset 354 define the coordinates on the amplitude axis and the time axis, respectively, of the vertices of a polygon 374. Time axis coordinate $C_t$ calculated by centroid calculator 332 has a temporal resolution greater than that of the two-dimensional samples constituting augmented subset 354. This is illustrated in FIG. 14C by the temporal offset between time axis coordinate $C_t$ and the time components $t_6$ and $t_7$ of the closest temporally-adjacent two-dimensional samples 372 and 376, respectively. Centroid calculator 332 outputs time axis coordinate $C_t$ to sample combiner 342 as the time component of the synthesized sample generated by sample synthesizer 330.

Also in sample synthesizer 330, amplitude component generator 334 generates the amplitude component of the synthesized sample representing the original subset from the original samples in the subset. Specifically, amplitude component generator 334 receives the original samples in the original subset directly or indirectly from sample selector 320 and generates the amplitude component of the synthesized sample by selecting the one of the original samples constituting original subset 352 or by subjecting two or more of the original samples in the original subset to interpolation. In an example, amplitude component generator 334 identifies original sample 362 having the greatest amplitude in original subset 352 shown in FIG. 14B as a maximum-amplitude sample and outputs the maximum-amplitude sample to sample combiner 342 as the amplitude component of the synthesized sample.

Figure 14D:
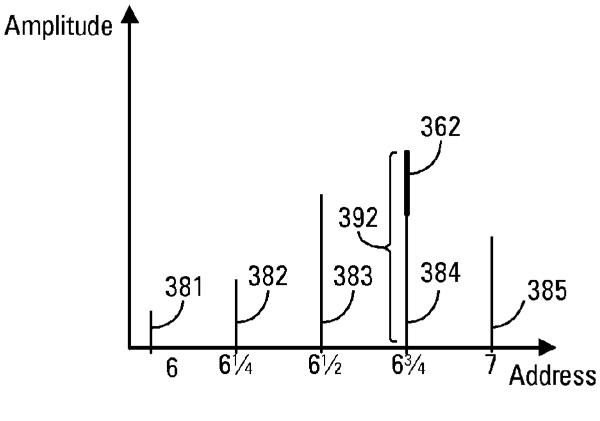

FIG. 14D schematically represents part of memory 329 in which the accumulated samples generated by accumulating the amplitude components of the synthesized samples representing peak 350 are stored. In the example shown, centroid calculator 332 calculates the time components of the synthesized samples with a temporal resolution four times that of the original samples generated by A/D converter 27. The portion of memory 329 shown has memory locations with memory addresses 6 and 7 respectively corresponding to time component values $t_6$ and $t_7$ shown in FIG. 14C. In addition, since the time components of the synthesized samples have a temporal resolution four of times that of the original samples, memory 329 additionally has memory locations with memory addresses 6⁄1;4, 6⁄1;2, 6⁄3;4 interposed between memory addresses 6 and 7 and corresponding to time component values $t_{6\text{-}1/4}$, $t_{6\text{-}1/2}$ and $t_{6\text{-}3/4}$, respectively, interposed at t/4 intervals between time component values $t_6$ and $t_7$. In the example shown, the time component of the synthesized sample provided by the time axis coordinate $C_t$ calculated as described above with reference to FIG. 14C is $t_{6\text{-}3/4}$, which corresponds to memory address 6⁄3;4. The scale of the amplitude axis shown in FIG. 14D differs from that shown in FIGS. 14A-14C.

At 381-385, FIG. 14D shows accumulated samples that have been generated by sample selector 320, sample synthesizer 330 and sample combiner 342 from mass scan signals generated during respective previously-performed mass scan operations. Accumulated samples 381-385 are stored in memory 329 at memory addresses 6, 6⁄1;4, 6⁄1;2, 6⁄3;4 and 7, respectively. Sample synthesizer 330 next generates a synthesized sample having, in this example, the amplitude of maximum-amplitude original sample 362 as its amplitude component and time component of $t_{6\text{-}3/4}$, as described above. Consequently, when sample combiner 342 receives the synthesized sample, the time component $t_{6\text{-}3/4}$ of the synthesized sample causes accumulated sample 384 to be read from memory address 6⁄3;4 in memory 329 and to be input to summer 330. Summer 330 sums accumulated sample 384 with the amplitude component of the synthesized sample to generate a new accumulated sample 392. Again in response to the time component $t_{6\text{-}3/4}$ of the synthesized sample, the new accumulated sample is written back in memory 329 at memory address 6⁄3;4.

Each synthesized sample generated by mass spectrometer 100 incorporating the example of sample processor 310 whose operation was just described has a temporal resolution four times that and, hence, a mass resolution twice that, of the original samples output by A/D converter 27. In each mass scan operation, each synthesized sample generated by sample synthesizer 330 is added to the accumulated sample stored in the location in memory 329 having the memory address corresponding to the time component of the synthesized sample to generate a new accumulated sample that constitutes part of a raw mass spectrum. The accuracy of the raw mass spectrum progressively increases as the number of mass scan operations increases. The temporal resolution, and, hence, mass resolution, of the raw mass spectrum is greater than the temporal resolution and mass resolution of the raw mass spectrum generated from the same number of mass scan operations by an embodiment of mass spectrometer 50 having the same conversion clock frequency by respective resolution ratios somewhat less than the resolution ratios between the synthesized samples and the original samples. Once sufficient mass scan operations have been performed to obtain a raw mass spectrum of a specified accuracy, the accumulated samples defining each peak in the raw mass spectrum are subject to a centroid calculation as described above to determine the time value represented by the peak, and the time value is converted to a mass value.

For a given range of mass detection and a given conversion clock frequency, the size of memory 329 in sample combiner 342 is p times that of memory 29 of mass spectrometer 50 described above with reference to FIG. 5, where p is the ratio of the temporal resolution of the synthesized samples generated by sample synthesizer 330 and that of the original samples generated by A/D converter 27. However, in embodiments of mass spectrometer 50 and mass spectrometer 100 in which the circuitry downstream of A/D converter 27 is implemented using the same type of integrated circuit, the fixed amount of memory available within the integrated circuit prevents memory 329 from being made any larger than memory 29. In this case, the greater mass resolution of mass spectrometer 100 is obtained at the cost of a reduction in the mass range that can be detected to $1/\sqrt{p}$ that of mass spectrometer 50 described above with reference to FIG. 5.

However, mass spectra are typically sparse, and each peak in the mass scan signal generated in each mass scan operation is represented by a single synthesized sample. Consequently, when the final mass scan has been performed and the raw mass spectrum has been generated, a value of zero remains in a majority of the memory locations in memory 329 in the above-described sample combiner 342. By configuring the sample combiner differently from sample combiner 342 described above with reference to FIG. 13, memory is used more efficiently and the mass resolution can be increased without a corresponding reduction in mass range.

Figure 15:
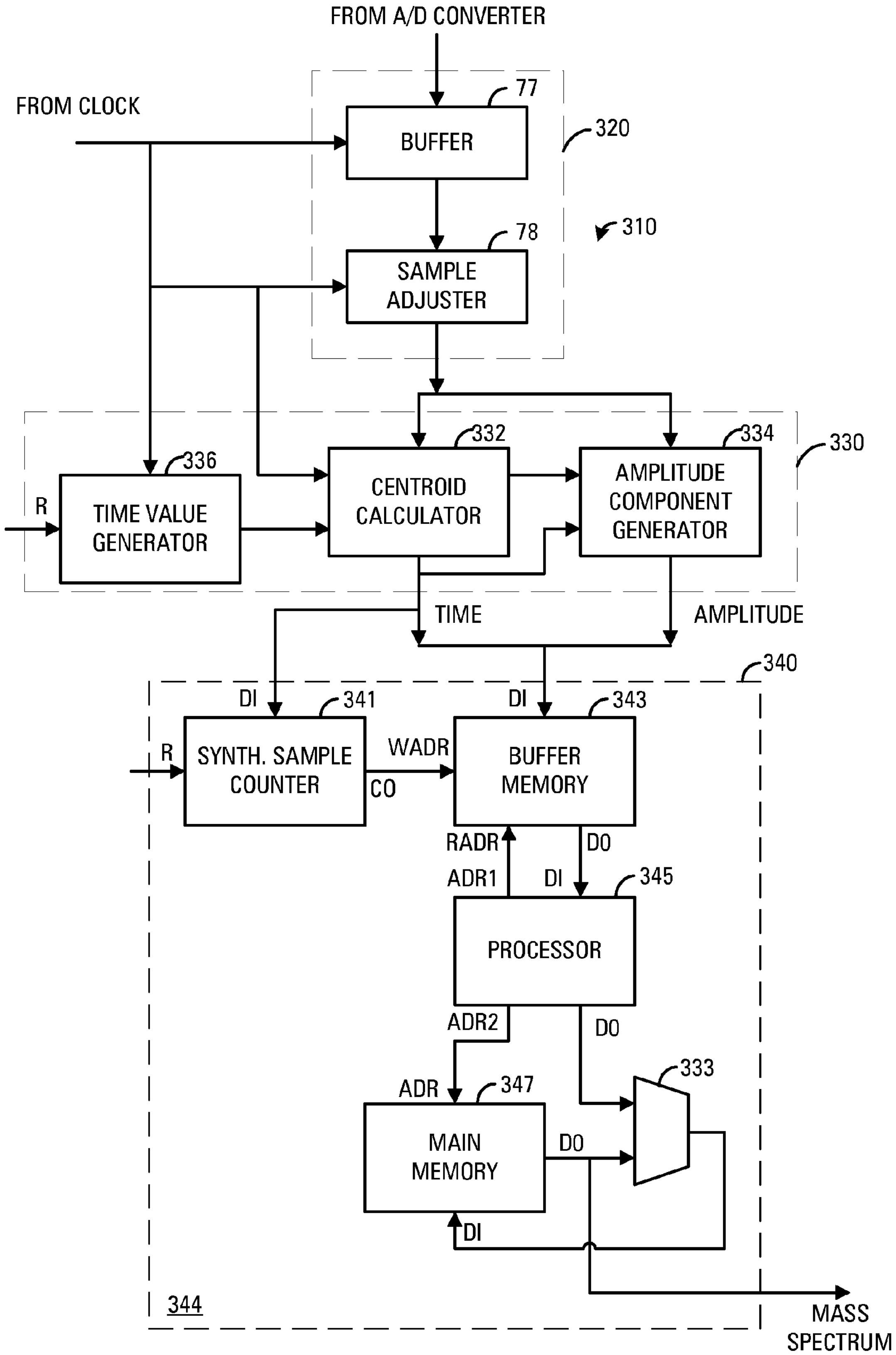
FIG. 15 is a block diagram showing a second example of the second embodiment of the sample processor of the mass spectrometer shown in FIG. 10.

FIG. 15 is a block diagram showing another example of sample processor 310 described above with reference to FIG. 10 incorporating a second example 344 of sample combiner 340. In the example shown, sample processor 310 is composed of sample selector 320, sample synthesizer 330 and sample combiner 344. Sample selector 320 and sample synthesizer 330 are described above with reference to FIG. 13 and will not be described again here.

Sample combiner 344 is composed of a synthesized sample counter 341, a buffer memory 343, a processor 345, a main memory 347 and summer 333. Sample counter 341 has a reset input R connected to receive a reset signal from controller 15 (FIG. 10), a data input DI connected to receive the time component of the synthesized samples output by sample synthesizer 330, and a count output CO. Buffer memory 343 has a data input DI connected to receive the both the time component and the amplitude component of each synthesized samples output by sample synthesizer 330. Buffer memory 343 additionally has a write address input WADR connected to the count output CO of sample counter 341, a read address input RADR and a data output DO. Processor 345 has a first address output ADR1 connected to the read address input RADR of buffer memory 343, a data input DI connected to the data output DO of buffer memory 343, a second address output ADR2 and a data output DO. Main memory 347 and summer 333 are connected to one another in an arrangement similar to that of memory 329 and summer 333 described above with reference to FIG. 13. Main memory 347 has an address input ADR connected to the second address output ADR2 of processor 345. The first input of summer 333 is connected to the data output DO of processor 345.

At the start of each mass spectrum measurement process performed by mass spectrometer 100, controller 15 supplies a reset signal to sample counter 341 to reset the count output by the sample counter to zero or another predetermined value. Such reset operation is unnecessary in embodiments in which sample counter 341 is operated as a stack. During the first mass scan operation performed by mass spectrometer 100, for each peak defined by the original samples constituting the mass scan signal, sample synthesizer 330 generates a respective synthesized sample that represents the peak. Sample synthesizer 330 outputs the synthesized sample to sample combiner 344. Specifically, sample synthesizer 330 outputs the time component of the synthesized sample to sample counter 341 and outputs both the amplitude component and the time component of the synthesized sample to buffer memory 343. Sample counter 341 detects the time component received at its data input DI and, in response to each change in the time component corresponding to sample synthesizer 330 outputting another synthesized sample, increments the count output at count output CO by one.

Buffer memory 343 stores each synthesized sample received from sample synthesizer 330 at a respective memory location whose address depends on the count received from sample counter 341 at write address input WADR.

Figure 16:
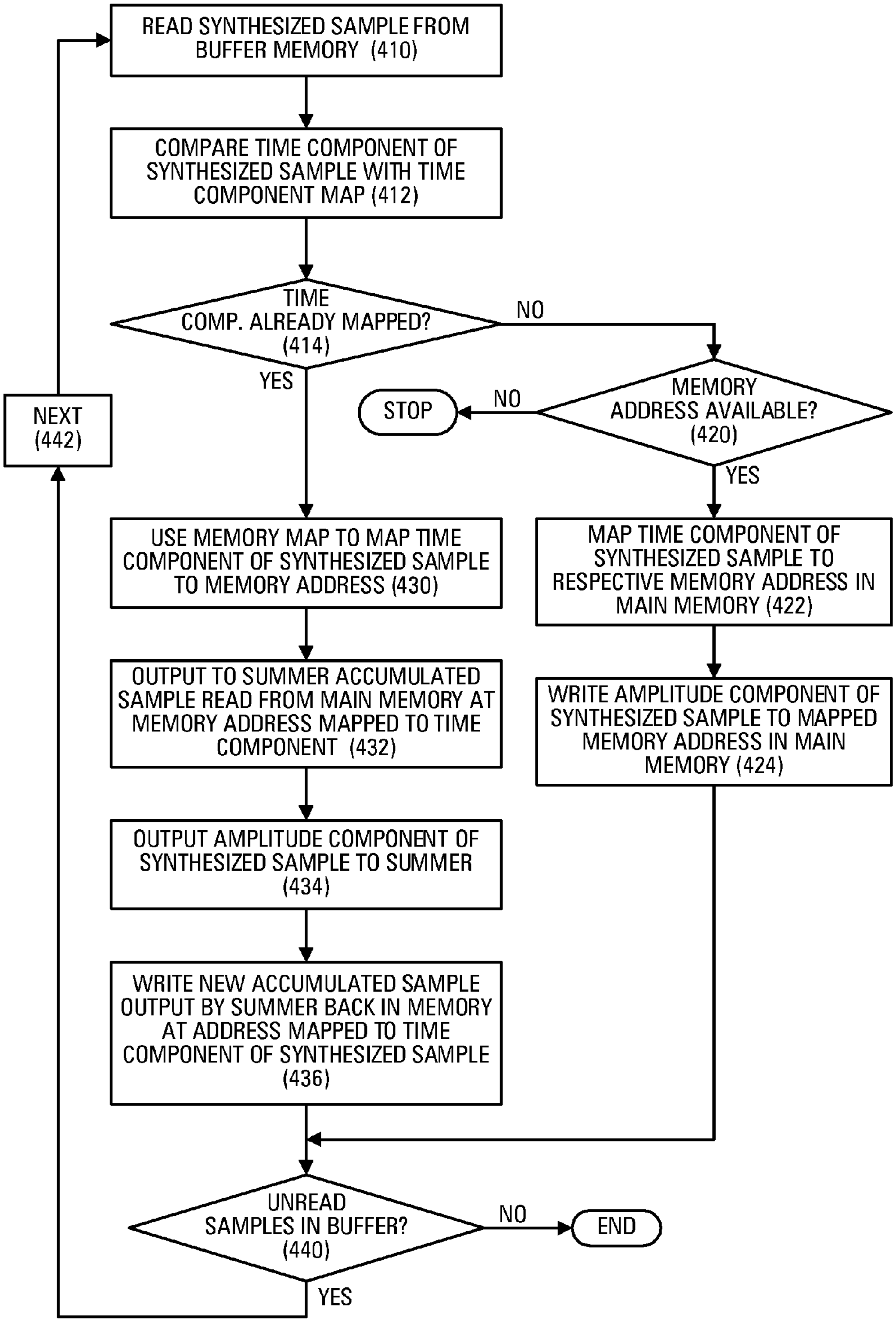
FIG. 16 is a flow chart illustrating the operation of the processor of the sample processor shown in FIG. 15.

FIG. 16 is a flow chart showing an example of the processing performed by processor 345 to generate a raw mass spectrum from the synthesized samples generated by sample synthesizer 330 and temporarily stored in buffer memory 343. Processor 345 may alternatively perform processing different from that illustrated in FIG. 16 to generate a raw mass spectrum from the synthesized samples generated by sample synthesizer 330 and temporarily stored in buffer memory 343. In block 410, after at least one synthesized sample has been stored in buffer memory 343, processor 345 reads a synthesized sample out from the buffer memory. In an example, the processor outputs successive buffer memory addresses to the read address input RADR of buffer memory 343. In response to the memory addresses, buffer memory 343 outputs to processor 345 the synthesized samples stored in the memory locations defined by the memory addresses.

In block 412, processor 345 compares the time component of the synthesized sample read from buffer memory 343 in block 410 with a time component map generated by the processor to determine whether the time component of the synthesized sample is already mapped to a respective memory location in main memory 347. The time component map will be described in greater detail below. Since no time component map exists when the first mass scan operation is performed, none of synthesized samples read from buffer memory 343 during the first mass scan operation has a time component already mapped to a respective memory location.

In block 414, processor 345 performs a test to determine whether the comparison performed in block 412 indicated that the time component of the synthesized sample is already mapped to a respective memory location in main memory 347. A YES result in block 414 causes execution to advance to block 430, which will be described below. A NO result in block 414 causes processor 345 to perform blocks 420-424 in which it maps the time component of the synthesized sample to a respective memory location in main memory 347 and writes the amplitude component of the synthesized sample at that memory location.

Specifically, in block 420, processor 345 performs a test to determine whether a memory address is available in main memory 347 to which the time component of the synthesized sample read in block 410 can be mapped. A YES result in block 420 causes execution to advance to block 422, which will be described below. A NO result in block 420 causes processor 345 to stop execution. This is done to allow mass spectrometer 100 to be adjusted in a manner that will prevent main memory 347 from overflowing when the mass spectrum measurement process is repeated. Typically, main memory 347 will overflow when sample adjuster 78 detects false peaks caused by noise in the analog ion detection signal output by ion detector 25. Increasing the threshold of ion detector 25 reduces the noise level in the ion detection signal, which reduces the number of peaks detected by sample adjuster 78 to one within the capacity of main memory 347.

In block 422, processor 345 maps the time component of the synthesized sample read in block 410 to a respective memory address within main memory 347. The memory mapping process just described generates the time component map used in block 412 to determine the memory location in main memory 347 where the amplitude components of synthesized samples having the same time component are accumulated.

In block 424, processor 345 writes the amplitude component of the synthesized sample at the memory location in main memory 347 to which the amplitude component of the synthesized sample was mapped in block 422. Execution then advances to block 440, which will be described below.

A synthesized sample whose time component is already mapped to a respective memory location in main memory 347 returns a YES result in block 414. This causes processor 345 to execute blocks 430-436 in which the amplitude component of the synthesized sample is accumulated at the memory location in main memory 347 mapped to the amplitude component of the synthesized sample. In block 430, processor 345 uses the memory map generated in block 422 to map the time component of the synthesized sample read from buffer memory 343 in block 410 to the respective memory address in main memory 347. Processor 345 outputs the memory address to the address input ADR of main memory 347. In block 432, processor 345 causes main memory 347 to perform a read operation in which the main memory outputs to the second input of summer 333 the accumulated sample stored at the memory address received in block 420.

In block 434, processor 345 outputs the amplitude component of the synthesized sample to the first input of summer 333. Summer 333 then sums the accumulated sample read from memory 347 with the amplitude component of the synthesized sample received from processor 345 to generate a new accumulated sample that is output to memory 347. Alternatively, processor 345 sums the amplitude component of the synthesized sample and the accumulated sample to generate the new accumulated sample. In this case, summer 333 is omitted. In block 436, processor 345 causes main memory 347 to perform a write operation in which the new accumulated sample output by summer 333 is written at the memory address received in block 430. Execution then advances to block 440, described below.

The sample accumulation process performed in blocks 430-436, in which a memory location in main memory 347 is mapped to the time component of the current synthesized sample, the accumulated sample is read from that memory location in main memory 347 and summed with the amplitude component of the synthesized sample to generate a new accumulated sample, and the new accumulated sample is written at the same location in main memory 347, provides the temporal alignment between the synthesized sample and the accumulated sample with which the synthesized sample is summed. Moreover, through the memory mapping process, synthesized samples generated in different mass scan operations and having equal time components are accumulated at the memory location in main memory 347 mapped to the time component.

In block 440, processor 345 performs a test to determine whether synthesized samples that have not been read by processor 345 remain in buffer memory 343. A NO result in block 440 causes execution to stop. A YES result in block 440 causes execution to return via block 442 to block 410, where processor 345 reads the next synthesized sample from buffer memory 343 as described above.

Mapping memory locations in main memory 347 to respective time components greatly increases the efficiency with which the main memory is used since substantially fewer of the memory locations store a value of zero when the final mass scan operation has been performed. Accordingly, an embodiment of main memory 347 of a given size is capable of storing a raw mass spectrum having a greater temporal (and, hence, mass) resolution and a greater mass range than a same-size embodiment of memory 329 described above with reference to FIG. 13.

The synthesized samples generated by sample synthesizer 330 from the mass scan signals generated in successive mass scans accumulating in memory 347 produce a raw mass spectrum having a progressively increasing accuracy. When the raw mass spectrum accumulated in main memory 347 achieves a specified accuracy, processor 345 reads the accumulated samples from main memory 347 in ascending or descending time component order and subjects the raw mass spectrum to a peak detection operation that identifies each peak exhibited by the raw mass spectrum. Processor 345 then subjects the accumulated samples defining each peak to a centroid calculation to determine the time value represented by the respective peak. The time values needed for reading out the accumulated samples in ascending or descending time component order and for the centroid calculation are determined using the memory map generated in block 420. The memory map is used to reverse map the memory locations in main memory 347 from which the accumulated samples are read to the respective time components mapped to those memory locations. The processor then converts the time value represented by each peak to a corresponding mass using the time-to-mass conversion equation described above. This last calculation is unnecessary in embodiments in which a mass value converter is interposed between time value generator 336 and centroid calculator 332, as described above.

In the above-described embodiments of mass spectrometer 100, sample processors 110, 210 and 310 can be implemented in hardware such as an integrated circuit having bipolar, N-MOS, P-MOS or CMOS devices. Design libraries comprising designs for such circuit elements suitable for implementing the above-described functions of sample processors 110, 210 and 310 are commercially available can be used to design such hardware implementation of sample processors 110, 210 and 310.

Sample processors 110, 210 and 310 can alternatively be implemented in pre-fabricated hardware devices such as an application-specific integrated circuit (ASIC) or a field-programmable gate array (FPGA). Design libraries comprising designs for implementing the above-described functions of sample processors 110, 210 and 310 in such pre-fabricated hardware devices are commercially available can be used to configure such pre-fabricated hardware devices to implement sample processors 110, 210 and 310.

Sample processors 110, 210 and 310 can alternatively be implemented in software running on a suitable computational device (not shown) such as a microprocessor or a digital signal processor (DSP). Sample processors 110, 210 and 310 may additionally constitute part of a digital signal processor. Programming modules capable of programming a computational device to provide the above-described functions of sample processors 110, 210 and 310 are commercially available and may be used to program a computational device to provide a software implementation of sample processors 110, 210 and 310. In such software implementations of sample processors 110, 210 and 310, the various functions described in this disclosure are typically ephemeral, and exist only temporarily as the program executes.

The program in response to which the computational device operates can be fixed in a suitable computer-readable medium (not shown) such as a floppy disk, a hard disk, a CD-ROM, a DVD-ROM, a flash memory, a read-only memory or a programmable read-only memory. The program is then transferred to a non-volatile memory that forms part of the computational device, or is external to the computational device. Alternatively, the program can be transmitted to the non-volatile memory of the computational device by a suitable data link.

Figure 17:
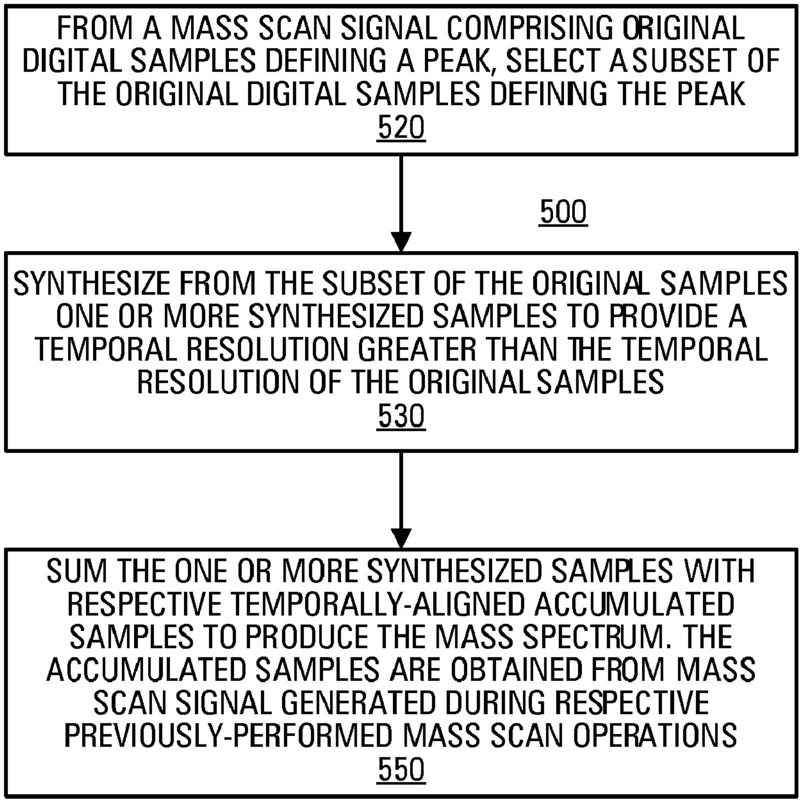
FIG. 17 is a flow chart showing an example of a method in accordance with an embodiment of the invention for generating a mass spectrum.

FIG. 17 is a flow chart showing an example of a method 500 in accordance with an embodiment of the invention for generating a mass spectrum. In block 520, from a mass scan signal comprising original samples defining a peak, a subset of the original samples defining the peak is selected. In block

530, one or more synthesized samples are synthesized from the subset of the original samples. The one or more synthesized samples provide a temporal resolution greater than the temporal resolution of the original samples. In block 550, the one or more synthesized samples are summed with respective, temporally-aligned accumulated samples to produce the mass spectrum. The accumulated samples are obtained from mass scan signals generated during respective previously-performed mass scan operations.

In an embodiment, the one or more synthesized samples are summed with respective temporally-aligned accumulated samples by summing each of the synthesized samples with a respective temporally-aligned accumulated sample read from a respective memory location to generate a new accumulated sample. The new accumulated sample is then stored at the memory location from which the accumulated sample was read.

Figure 18:
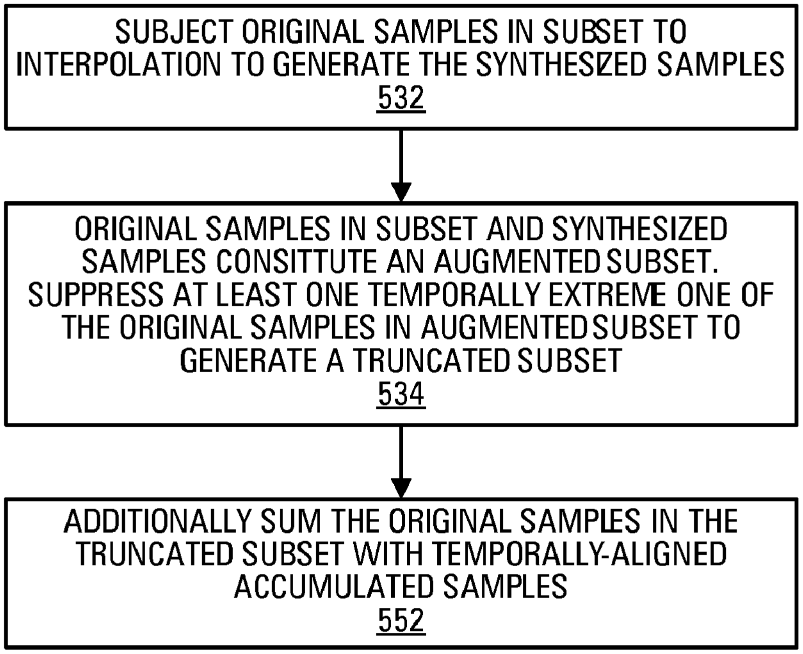
FIG. 18 is a flow chart showing an example of the synthesizing and the summing shown in FIG. 17.

FIG. 18 is a flow chart showing an example of the synthesizing performed in block 530 and the summing performed in block 550. In block 532, the one or more synthesized samples are synthesized by subjecting the original samples in the subset to interpolation to generate the synthesized samples. In block 534, the original samples in the subset and the synthesized samples constitute an augmented subset, and at least one temporally-extreme one of the original samples in the augmented subset is suppressed to generate a truncated subset. In block 552, the original samples in the truncated subset are additionally summed with respective temporally-aligned accumulated samples.

Figure 19:
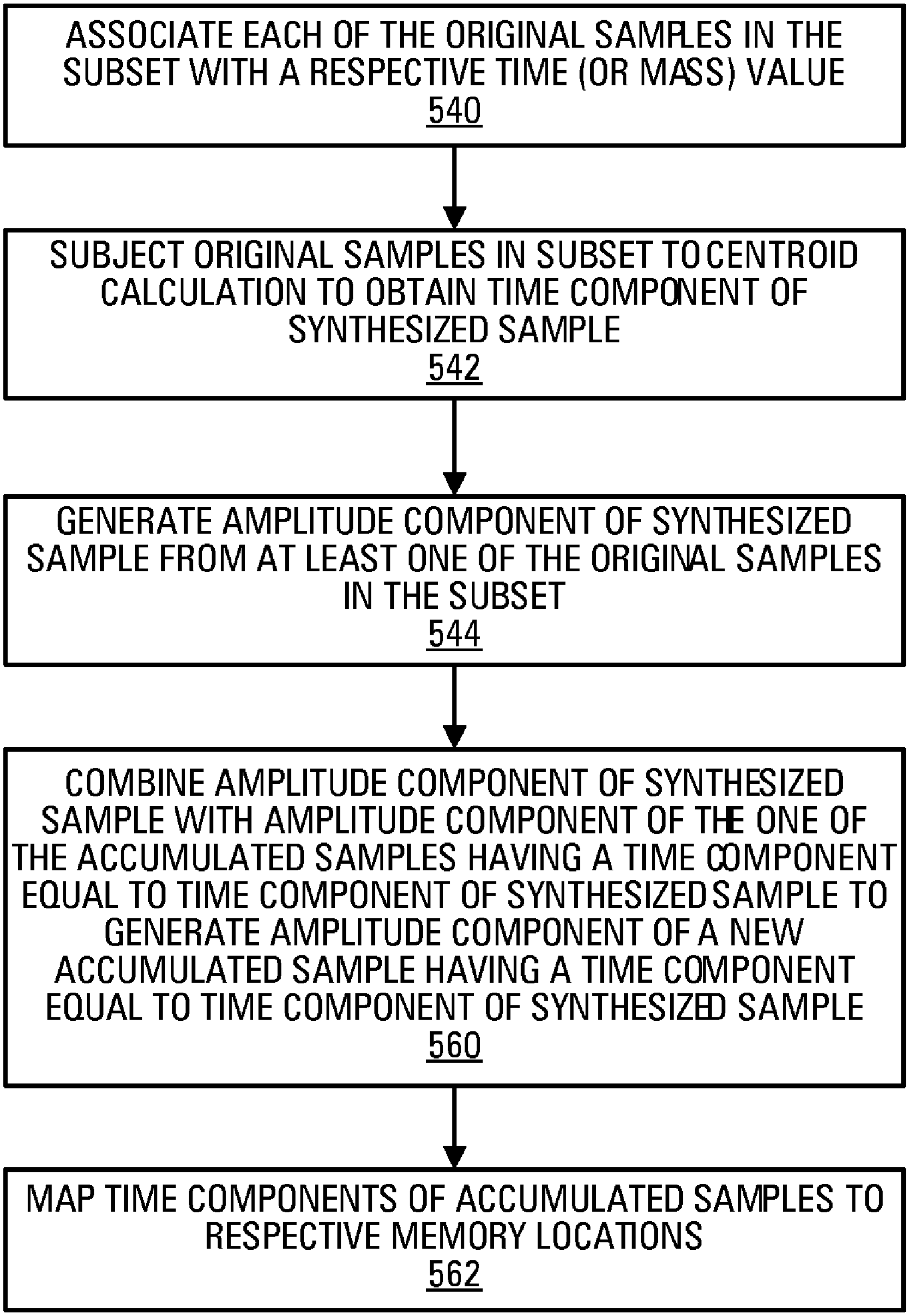
FIG. 19 is a flow chart showing another example of the synthesizing and the summing shown in FIG. 17.

FIG. 19 is a flow chart showing another example of the synthesizing performed in block 530 and the summing performed in block 550. In this example, the synthesizing performed in block 530 generates a single synthesized sample comprising a time component and an amplitude component. In block 540, each of the original samples in the subset is associated with a respective time value to generate an augmented subset of respective two-dimensional samples. Alternatively, a mass value is used instead of the time value. In block 542, the two-dimensional samples in the augmented subset are subject to a centroid calculation to obtain the time component of the synthesized sample. In block 544, the amplitude component of the synthesized sample is generated from at least one of the original samples in the subset. In block 560, the amplitude component of the synthesized sample is summed with the amplitude component of the one of the accumulated samples having a time component equal to the time component of the synthesized sample to generate the amplitude component of a new accumulated sample having a time component equal to the time component of the synthesized sample. Additionally, in block 562, the time components of the accumulated samples are mapped to respective memory locations. This may be done by storing the accumulated sample at a memory location defined by the time component of the synthesized sample, as described above with reference to FIG. 13. Alternatively, a memory mapping scheme similar to that described above with reference to FIG. 16 can be used.

In an embodiment, a respective accumulated sample is generated by a process in which the amplitude components of synthesized samples generated during the previously-performed mass scan operations and having equal time components are accumulated. In another embodiment, the accumulated samples are generated by subjecting original samples obtained in the previously-performed mass scan operations to respective selecting, synthesizing and summing, as described above with reference to FIG. 17.

This disclosure describes the invention in detail using illustrative embodiments. However, the invention defined by the appended claims is not limited to the precise embodiments described.

We claim:

1. A method for generating a mass spectrum, the method comprising:

from a mass scan signal comprising original samples defining a peak, selecting a subset of the original samples defining the peak, the original samples having a temporal resolution;

synthesizing from the subset of the original samples one or more synthesized samples providing a temporal resolution greater than the temporal resolution of the original samples; and summing the one or more synthesized samples with respective temporally-aligned accumulated samples to produce the mass spectrum, the accumulated samples obtained from mass scan signals generated during respective previously-performed mass scan operations.

2. The method of claim 1, in which the synthesizing comprises subjecting the subset of the original samples to interpolation to generate the synthesized samples.

3. The method of claim 2, in which:

the original samples in the subset and the synthesized samples collectively constitute an augmented subset;

the synthesizing additionally comprises suppressing at least one temporally-extreme one of the original samples in the augmented subset to generate a truncated subset; and the summing additionally comprises summing the original samples in the truncated subset with respective temporally-aligned ones of the accumulated samples.

4. The method of claim 1, in which:

the synthesizing generates a single synthesized sample comprising a time component and an amplitude component, the time component having a greater temporal resolution than the original samples; and the synthesizing comprises:

subjecting the original samples in the subset to a centroid calculation to obtain the time component of the synthesized sample, and generating the amplitude component of the synthesized sample from at least one of the original samples in the subset.

5. The method of claim 4, in which the synthesizing additionally comprises, prior to the subjecting, associating each of the original samples in the subset with a respective time value or mass value.

6. The method of claim 5, in which the generating the amplitude component of the synthesized sample comprises subjecting two or more of the original samples in the subset and the respective time values thereof to interpolation to generate a two-dimensional sample having an amplitude component calculated by the interpolation and a time component equal to the time component of the synthesized sample, the amplitude component of the two-dimensional sample providing the amplitude component of the synthesized sample.

7. The method of claim 4, in which the generating the amplitude component of the synthesized sample comprises selecting one of the original samples in the subset as the amplitude component of the synthesized sample.

8. The method of claim 4, in which the summing comprises summing the amplitude component of the synthesized sample with the amplitude component of the one of the accumulated samples having a time component equal to the time component of the synthesized sample to generate the amplitude component of a new accumulated sample having a time component equal to the time component of the synthesized sample.

9. The method of claim 8, additionally comprising mapping the time components of the accumulated samples to respective memory locations.

10. The method of claim 8, additionally comprising generating a respective one of the accumulated samples by a process comprising accumulating the amplitude components of synthesized samples obtained from the sequences of original samples generated during the previously-performed mass scan operations and having equal time components.

11. The method of claim 1, additionally comprising generating the accumulated samples by a process comprising subjecting the mass scan signals generated during the respective previously-performed mass scan operations to respective selecting, synthesizing and summing.

12. The method of claim 1, in which the summing comprises:

summing each of the one or more synthesized samples with a respective temporally-aligned one of the accumulated samples read from a memory location to generate a new accumulated sample; and storing the new accumulated sample at the memory location from which the one of the accumulated samples was read.

13. A mass spectrometer, comprising:

a sample selector operable to select, from a mass scan signal comprising original samples defining a peak, a subset of the original samples defining the peak, the original samples having a temporal resolution;

a sample synthesizer operable to synthesize from the subset of the original samples one or more synthesized samples providing a temporal resolution greater than the temporal resolution of the original samples; and a sample combiner operable to sum the one or more synthesized samples with respective temporally-aligned accumulated samples to produce a mass spectrum, the accumulated samples generated by the sample selector, the sample synthesizer and the sample summer from mass scan signals obtained during respective previously-performed mass scan operations.

14. The mass spectrometer of claim 13, in which the sample synthesizer comprises an interpolator operable to subject the subset of the original samples to interpolation to generate the synthesized samples.

15. The mass spectrometer of claim 14, in which:

the original samples in the subset and the synthesized samples collectively constitute an augmented subset;

the sample synthesizer additionally comprises a sample suppressor operable to suppress at least one temporally-extreme one of the original samples in the augmented subset to generate a truncated subset; and the sample combiner comprises a memory and a summer, the memory operable to store the accumulated samples, the summer operable to sum the synthesized samples in the truncated subset with the temporally-aligned accumulated samples stored in the memory.

16. The mass spectrometer of claim 15, in which the summer is additionally operable to sum the original samples in the truncated subset with respective temporally-aligned accumulated samples.

17. The mass spectrometer of claim 15, in which:

the memory comprises a memory location in which a respective one of the accumulated samples is stored;

the summer is operable to perform operations comprising summing the one of the accumulated samples read from the memory location with a respective one of the synthesized samples in the truncated subset to generate a new accumulated sample; and the memory is operable to store the new accumulated sample at the memory location.

18. The mass spectrometer of claim 13, in which:

the sample synthesizer generates a single synthesized sample from the original samples in the subset, the synthesized sample comprising a time component and an amplitude component; and the sample synthesizer comprises:

a centroid calculator operable to subject the original samples in the subset to a centroid calculation to obtain the temporal component of the synthesized sample, and an amplitude component generator operable to generate the amplitude component of the synthesized sample from at least one of the original samples in the subset.

19. The mass spectrometer of claim 18, in which the sample synthesizer additionally comprises a time value generator operable to generate a time value for each of the original samples in the subset.

20. The mass spectrometer of claim 19, in which the amplitude component generator is operable to subject two or more of the original samples in the subset and the respective time values thereof to interpolation to generate a two-dimensional sample having an amplitude component calculated by the interpolation and a time component equal to the time component of the synthesized sample, the amplitude component of the two-dimensional sample providing the amplitude component of the synthesized sample.

21. The mass spectrometer of claim 18, in which the amplitude component generator is operable to select one of the original samples in the subset as the amplitude component of the synthesized sample.

22. The mass spectrometer of claim 18, in which the sample combiner is operable to combine the amplitude component of the synthesized sample with the amplitude component of the one of the accumulated samples having a time component equal to the time component of the synthesized sample to generate the amplitude component of a new accumulated sample having a time component equal to the time component of the synthesized sample.

23. The mass spectrometer of claim 18, in which the time components of the accumulated samples are mapped to respective memory locations.

24. The mass spectrometer of claim 18, in which the sample combiner is operable to generate the accumulated samples by accumulating the amplitude components of synthesized samples generated during the previously-performed mass scan operations and having equal time components.

25. A computer-readable medium in which is fixed a program operable to cause a computational device to perform a method that generates a mass spectrum, the method comprising:

selecting, from a mass scan signal comprising original samples defining a peak, a subset of the original samples defining the peak, the original samples having a temporal resolution;

synthesizing from the subset of the original samples one or more synthesized samples providing a temporal resolution greater than the temporal resolution of the original samples; and summing the one or more synthesized samples with respective temporally-aligned accumulated samples to produce the mass spectrum, the accumulated samples obtained from mass scan signals generated during respective previously-performed mass scan operations.

26. The computer-readable medium of claim 25, in which:

the synthesizing comprises:

subjecting the subset of the original samples to interpolation to generate the synthesized samples, the original samples in the subset and the synthesized samples collectively constituting an augmented subset, and suppressing at least one temporally-extreme one of the original samples in the augmented subset to generate a truncated subset; and the summing additionally comprises summing the original samples in the truncated subset with respective temporally-aligned accumulated samples.

27. The computer-readable medium of claim 25, in which:

the synthesizing generates a single synthesized sample comprising a time component and an amplitude component, the time component having a greater temporal resolution than the original samples; and the synthesizing comprises:

associating the original samples in the subset with respective time values or mass values to generate an augmented subset of respective two-dimensional samples, subjecting the two-dimensional samples in the augmented subset to a centroid calculation to obtain the time component of the synthesized sample, and generating the amplitude component of the synthesized sample from at least one of the original samples in the subset.

* * * * *